US012041304B2

(12) United States Patent
Ouegnin et al.

(10) Patent No.: US 12,041,304 B2
(45) Date of Patent: Jul. 16, 2024

(54) METHODS AND APPARATUS FOR CO-VIEWING ADJUSTMENT

(71) Applicant: The Nielsen Company (US), LLC, New York, NY (US)

(72) Inventors: Jonathan Ouegnin, Wendell, NC (US); Joshua Zinzer, Yorkville, IL (US); Lauren Howard, Chicago, IL (US); Balachander Shankar, Tampa, FL (US); Michelle Gelman, Reno, NV (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/978,051

(22) Filed: Oct. 31, 2022

(65) Prior Publication Data

US 2023/0209133 A1   Jun. 29, 2023

Related U.S. Application Data

(60) Provisional application No. 63/294,761, filed on Dec. 29, 2021.

(51) Int. Cl.
*H04N 21/442* (2011.01)
*H04N 21/466* (2011.01)

(52) U.S. Cl.
CPC ... *H04N 21/44218* (2013.01); *H04N 21/4667* (2013.01)

(58) Field of Classification Search
None
See application file for complete search history.

(56) References Cited

U.S. PATENT DOCUMENTS

| | | | |
|---|---|---|---|
| 2008/0059988 A1* | 3/2008 | Lee | H04N 21/44218 725/9 |
| 2009/0070797 A1* | 3/2009 | Ramaswamy | H04N 21/4524 725/10 |
| 2014/0105462 A1* | 4/2014 | Ramaswamy | H04N 21/44222 382/103 |
| 2015/0186403 A1* | 7/2015 | Srivastava | H04N 21/44226 707/692 |
| 2019/0236625 A1* | 8/2019 | Verkasalo | G06F 16/00 |
| 2023/0410547 A1* | 12/2023 | LiVoti | G06V 20/52 |

* cited by examiner

*Primary Examiner* — Alexander Q Huerta

(57) ABSTRACT

Methods and apparatus disclosed herein can be used to perform co-viewer adjustment. An example apparatus or viewership adjustment includes at least one memory, machine readable instructions, and processor circuitry to execute the machine readable instructions to determine compliant and non-compliant household panel meter data based on household metrics for past household viewing behavior, adjust undercounted viewership data based on an active media session interval associated with the household metrics, adjust overcounted viewership data based on a viewership model, the viewership model trained using the compliant household panel meter data, and output adjusted viewership data based on the adjusted undercounted viewership data and adjusted overcounted viewership data.

20 Claims, 19 Drawing Sheets

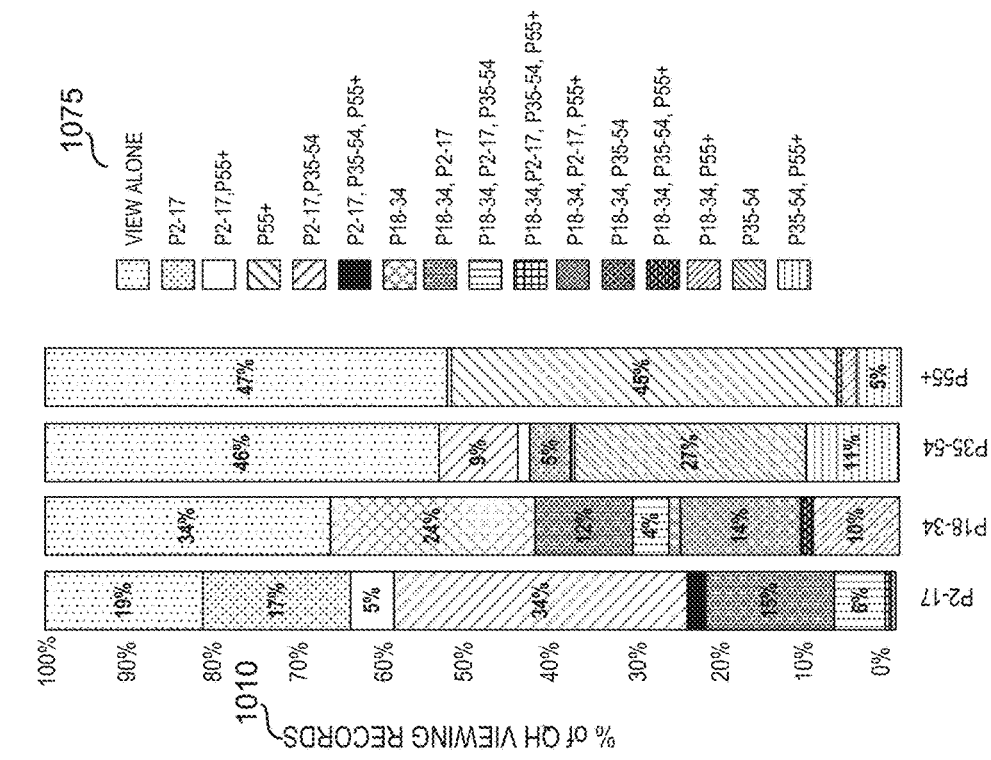
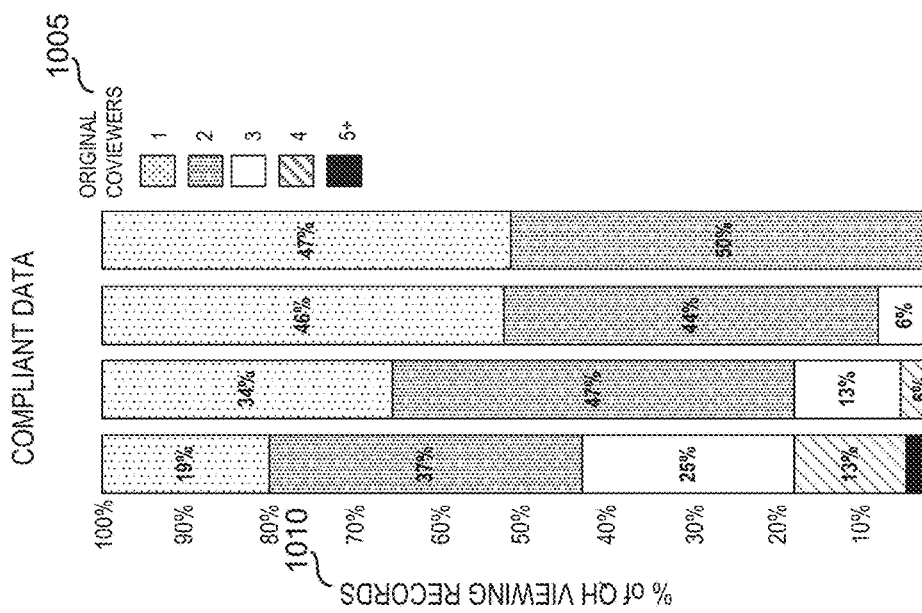
FIG. 10C

| METRIC | METRIC IS CALCULATED AT: | DESCRIPTION |
|---|---|---|
| AUDIENCE CHANGE RATE | HH LEVEL | MEASURE OF BUTTON-PUSHING AFTER AUDIENCE SELECTION. CALCULATED AS (NUMBER OF AUDIENCE CHANGES) / (QH VIEWED) |
| AUDIENCE ADD RATE | HH LEVEL | MEASURE OF HOW OFTEN VIEWERS ARE ADDED AFTER INITIAL PROMPT. CALCULATED AS (NUMBER OF AUDIENCE CHANGES) / (QH VIEWED) |
| AUDIENCE DROP RATE | HH LEVEL | MEASURE OF BUTTON-PUSHING AFTER INITIAL PROMPT. CALCULATED AS (NUMBER OF AUDIENCE CHANGES) / (QH VIEWED) |
| NO CHANGE SESSION PERCEPTAGE | HH LEVEL | PERCENTAGE OF TV ON SESSIONS, WHERE DURATION >= 60 MINUTES, THAT HAVE NO AUDIENCE CHANGE |
| ONE VIEWER PERCENTAGE | HH LEVEL | PERCENTAGE OF TV ON SESSIONS WHERE VIEWER COUNT = 1 |
| HH MEMBER NOT VIEWING | HH LEVEL | HH MEMBERS WITH NO VIEWING |
| MVP PERCENTAGE | HH LEVEL | PERCENTAGE OF TOTAL VIEWING QHS BY MOST VIEWING PERSON |
| METER PROMPT RATE | HH LEVEL | CALCULATE METER PROMPT RATE= METER PROMPT MINUTES/ TOTAL MINUTES TUNED |
| EXCESSIVE METER PROMPT | TV ON SESSION LEVEL | METER PROMPT MINUTES EXCEED THRESHOLD (EXAMPLE 60 MINUTES). |
| AUDIENCE CHANGE = YES | TV ON SESSION LEVEL | HOME PUSHES BUTTONS AFTER START -- EITHER ADDING PEOPLE, DROPPING PEOPLE BOTH |
| AUDIENCE ADD = YES | TV ON SESSION LEVEL | THERE IS AT LEAST 1 AUDIENCE CHANGE DURING A TV ON SESSION |
| AUDIENCE DROP = YES | TV ON SESSION LEVEL | THERE IS AT LEAST 1 AUDIENCE DROP DURING A TV ON SESSION |

| GOOD/BAD SPLIT FOR ADD VS REMOVE: FEATURE LIST | | |
|---|---|---|
| ADD ONLY | REMOVE ONLY | ADD & REMOVE |
| ONE VIEWER PERCENTAGE | AUDIENCE DROP RATE | AUDIENCE CHANGE RATE |
| AUDIENCE ADD RATE | AUDIENCE DROP= YES, NO | NO CHANGE SESSION PERCENTAGE |
| HH MEMBER NOT VIEWING | | METER PROMPT RATE |
| HHMVP PERCENTAGE | | EXCESSIVE METER PROMPT |
| AUDIENCE ADD= YES, NO | | AUDIENCE ADD= YES, NO |
| | | TV SET LEVEL GOOD CONDITION |

FIG. 11

METHODS AND APPARATUS FOR CO-VIEWING ADJUSTMENT

RELATED APPLICATIONS

This patent claims the benefit of U.S. Patent Application No. 63/294,761, filed on Dec. 29, 2021. U.S. Patent Application No. 63/294,761 is hereby incorporated herein by reference in its entirety. Priority to U.S. Patent Application No. 63/294,761 is claimed.

FIELD OF THE DISCLOSURE

This disclosure relates generally to computer-based audience monitoring, and, more particularly, to methods and apparatus for co-viewing adjustment.

BACKGROUND

Media is accessible to users through a variety of platforms. For example, media can be viewed on television sets, via the Internet, on mobile devices, in-home or out-of-home, live or time-shifted, etc. Understanding consumer-based engagement with media within and across a variety of platforms (e.g., television, online, mobile, and emerging) allows media providers and website developers to increase user engagement with their media.

BRIEF DESCRIPTION OF THE DRAWINGS

FIG. 10C illustrates example graphical representations of compliant data based on a number of co-viewers associated with a given viewer's age group and compliant data based on the age groups of the co-viewers.

FIG. 11 illustrates example features associated with compliance or non-compliance and a mapping of the features to non-compliance conditions.

The figures are not to scale. In general, the same reference numbers will be used throughout the drawing(s) and accompanying written description to refer to the same or like parts.

Figure 1:
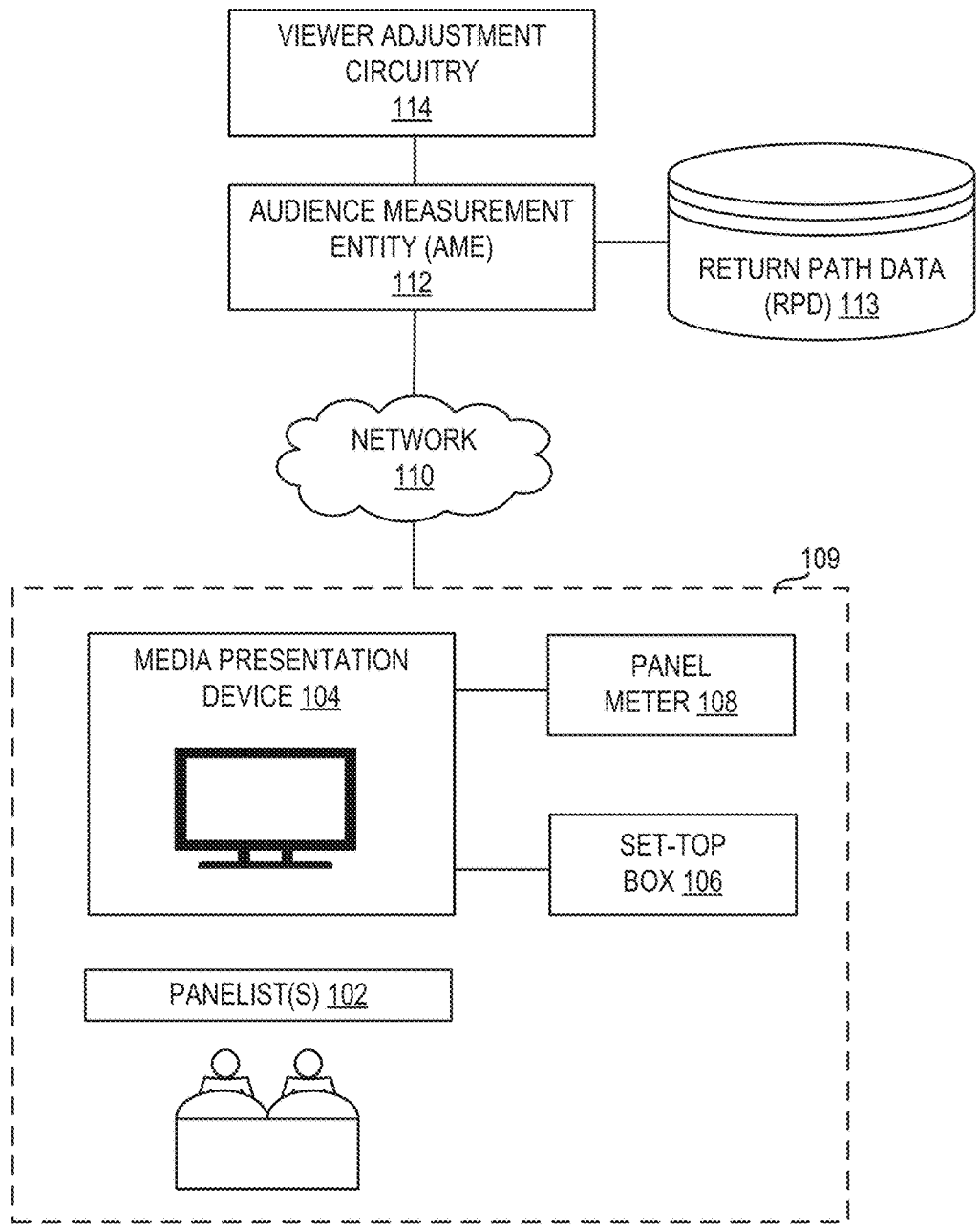
FIG. 1 is an example environment including viewer adjustment circuitry to perform viewer adjustment in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Audience measurement entities (AMEs) perform measurements to determine the number of people (e.g., an audience) who engage in viewing television, listening to radio stations, browsing websites, etc., all of which are examples of media. Given that companies and/or individuals producing media (e.g., content and/or advertisements) want to understand the reach and effectiveness of their content, it is useful to identify such information. To achieve this, companies such as The Nielsen Company, LLC (US), LLC utilize meters such as a people panel meter (PPM), a local people meter (LPM), and/or any other type of meter that can be used to determine, for example, a number of people in a household viewing a given television program and/or the viewing behaviors of individuals who volunteer to be part of a panel (e.g., panelists). Panelists are users who have provided demographic information at the time of registration into a panel, allowing their demographic information to be linked to the media they choose to listen to or view. As a result, the panelists (e.g., the audience) represent a statistically significant sample of the large population (e.g., the census) of media consumers, allowing broadcasting companies and advertisers to better understand who is utilizing their media and maximize revenue potential.

Many home entertainment systems include a set-top box (STB) to receive media from a service provider and display the media on a media device, such as television. Examples of service providers include cable television providers, satellite television providers, over-the-top (OTP) service providers, Internet service providers, etc. Set-top boxes (STBs) in cable and satellite subscribers' homes access second-by-second subscriber viewing data, including a user's television tuning data. Viewing data can include programs watched by subscribers, while tuning data can include locations of subscriber households, changes of a channel, the times at which programs are accessed, etc. STBs report return path data (RPD), which includes such television tuning and viewing data, back to multi-channel video programming distributor providers (e.g., cable and satellite providers). For example, to help supplement panel data, an AME, such as The Nielsen Company (US), LLC, may reach agreements with pay-television provider companies to obtain the television tuning information derived from the STBs and/or other devices/software, which is referred to herein, and in the industry, as return path data (RPD). RPD data may include, for example, tuning data relating to tuning events and/or commands received by the STB (e.g., power on, power off, change channel, change input source, record a presentation of media, volume up/down, etc.). The RPD data can also include viewing data, relating to the type of media content accessed by the user (e.g., an advertisement, a movie, etc.) and the time of day the media content was accessed (e.g., the time/date a media presentation was started, the time a media presentation was completed, when a media presentation was paused, etc.). RPD data may additionally or alternatively include commands sent to a content provider by the STB (e.g., switch input sources, record a media presentation, delete a recorded media presentation, etc.), heartbeat signals, or the like. The RPD data may additionally or alternatively include a household identification (e.g., a household ID) and/or a STB identification (e.g., a STB ID).

Audience measurement entities (AMEs), such as The Nielsen Company (US), LLC, monitor the viewing of media presented by media devices. For example, an AME may extrapolate ratings metrics and/or other audience measurement data for a total television viewing audience from a relatively small sample of panel homes. The panel homes may be well studied and are typically chosen to be representative of an audience universe as a whole. However, the requirement for audience member(s) (e.g., panelists) to check-in using a panel meter (e.g., PPM, LPM, etc.) to indicate that they are present in the audience can result in non-compliance on the part of the audience member(s). As such, there may be biases in the reported audience measurement estimates because panelists may not log themselves in and/or out of the audience correctly (e.g., using the panel meter). Furthermore, the audience of a television viewing session may not be accurately represented when there is an undercounting and/or an overcounting of co-viewers (e.g., household members not included in the audience count). As such, correct identification of co-viewers present during a television session can improve audience measurement counts.

Methods and apparatus disclosed herein permit co-viewer adjustments for improved assessment of audience counts associated with a media session. In examples disclosed herein, a panel can be split into subsets of compliant and non-compliant data (e.g., compliant button-pushers and non-compliant button-pushers), instead of assuming that all viewing data is representative of compliant panelists (e.g., panelists actively and accurately reporting audience-based viewing). In examples disclosed herein, viewership can be modeled in non-compliant scenarios based on viewing data identified as being compliant. For example, potential non-compliant households (e.g., including panelists who do not accurately log television viewing data) can be identified using past household viewing behavior in homes with a local people meter (LPM). Features such as audience changes, percentage of sessions with single viewers, and/or one viewer-based dominating viewing can be used to determine the likelihood of a household being non-compliant with reporting viewership. In some examples, non-compliant viewing sessions (e.g., in households with LPMs) can be identified for modification using eligible television sessions (e.g., TV on sessions) based on a comparison of LPM data and PPM data. In some examples, features such as a number of audience changes, household size, daypart, and/or television session length can be used to identify eligible television sessions. In examples disclosed herein, the identified compliant data is used to build a viewership model and apply the model to non-compliant data, resulting in an adjustment to non-compliant data that better aligns with data reported by households that are compliant with the reporting and/or logging requirements associated with a given panel meter. In examples disclosed herein, a viewing session adjustment is performed to determine potential co-viewers (e.g., of an audience member in a given household) that are not selected to account for underreporting of audience viewers during a media session (e.g., television session). Furthermore, a viewing session adjustment can also be performed to remove one or more audience members who report as viewing a television session without identifying when their viewing is completed to allow for accounting of overcounting of audience viewers during the media session. In examples disclosed herein, overcounting of audience viewership can be performed using a model based on return path data identified using a set-top box located in the household.

Although examples disclosed herein are discussed in connection with panel-based data, disclosed examples apply to audience-based measurement more generally. Thus, although examples disclosed herein refer to, for instance, panelists associated with media exposure, examples disclosed herein more generally apply to audience measurement activities and/or any other types of panel-based assessments.

FIG. 1 is an example environment 100 to monitor panel meter usage. The environment 100 includes example panelist(s) 102, an example media presentation device 104, an example set-top box 106, an example panel meter 108, an example network 110, an example audience measurement entity (AME) 112, an example return path data (RPD) database 113, and example viewer adjustment circuitry 114.

The panelist(s) 102 can include individuals who volunteer to be part of a panel. Panelists 102 are users who have provided demographic information at the time of registration into a panel, allowing their demographic information to be linked to the media they choose to listen to or view. In some examples, the panelist(s) 102 provide information about media access activities. For example, panelists can install the panel meter 108 to actively participate in the panel (e.g., send activity logs). In examples disclosed herein, panelist(s) 102 can report viewership during a media session (e.g., television session) using an installed panel meter (e.g., portable people meter (PPM), local people meter (LPM), etc.). In some examples, panelist(s) 102 include co-viewer(s) who are members of the household and can be reported as co-viewers during a media session. In examples disclosed herein, co-viewers refer to one or more additional persons who are present and exposed to the media but are not counted as part of the audience and/or additional persons who are known to be co-viewers but are overcounted (e.g., included as part of the audience count even though they are not present during the media presentation). When the example panelist(s) 102 utilize the media presentation device 104 to access media through the example network 110, the AME 112 (e.g., AME servers) stores panelist activity data associated with their demographic information via one or more meter(s) 108.

The media presentation device 104 can include any type of media presentation device and/or electronic user device. In examples disclosed herein, the media presentation device 104 is a television set. In operation, the media presentation device 104 presents media such as television shows, movies, commercials, etc. In the example of FIG. 1, the media presentation device 104 can be in communication with the set-top box 106 and/or the panel meter 108 to determine panelist exposure to specific media (e.g., audience viewership). In the example of FIG. 1, the media presentation device 104 is located in an example media presentation environment 109 that includes panelist(s) 102, the set-top box 106, and/or the panel meter 108. For example, the media presentation environment 106 can correspond to a panelist home and/or specific room of the panelist home that houses the media presentation device 104 and the corresponding installed set-top box 106 and/or panel meter 108.

The set-top box (STP) 106 associated with media presentation device 104 can include, for example, a STB associated with a home entertainment system. The home entertainment system can receive media from a media service provider and display the media on the media presentation device 104 (e.g., television, etc.). STB data includes some or all of the data collected by a given STB 106, including tuning events and/or commands received by the STB 106 (e.g., power on, power off, change channel, change input source, start presenting media, pause the presentation of media, record a presentation of media, volume up/down, etc.). The STB data may additionally or alternatively include commands sent to the media service provider by the STB 106 (e.g., switch input sources, record a media presentation, delete a recorded media presentation, the time/date a media presentation was started, the time a media presentation was completed, etc.). The STB data can include a household identification (e.g., a household ID) and/or a STB identifier (e.g., a STB ID) for the STB 106. The STB 106 can also interact with the panel meter 108 to provide STB data (e.g., tuning data and/or viewing data) directly to the panel meter 108.

The panel meter 108 can be implemented by software that collects data of interest concerning usage of the monitored device (e.g., media presentation device 104). The panel meter 108 can collect data indicating media access activities (e.g., television shows, advertisements, etc.) to which the panelist(s) 102 and/or their co-viewers are exposed. This data is uploaded, periodically or aperiodically, to a data collection facility (e.g., the audience measurement entity server). In some examples, the panel meter 108 can include a local people meter (LPM), a portable people meter (PPM), and/or a stationary metering device (e.g., such as Global Television Audience Metering (GTAM) meters, active/passive (A/P) meters, Nano meters, etc.) provided to AME panelist(s) 102. In some examples, the panel meter 108 can include a memory, a microphone, a wireless transceiver, and/or a power supply (e.g., rechargeable batteries).

The network 110 may be implemented using any suitable wired and/or wireless network(s) including, for example, one or more data buses, one or more Local Area Networks (LANs), one or more wireless LANs, one or more cellular networks, the Internet, etc. As used herein, the phrase "in communication," including variants thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

The AME 112 operates as an independent party to measure and/or verify audience measurement information relating to media accessed by panelists. When media is accessed using the media presentation device 104, the AME 112 stores information relating to user viewership and/or media exposure (e.g., length of time that a panelist viewed a television program, etc.). In some examples, the AME 112 receives demographic information from the enrolling people (e.g., panelist(s) 102) so that subsequent correlations may be made between advertisement/media exposure to those panelists and different demographic markets, allowing the panelist(s) 102 to represent a statistically significant sample of the large population of media consumers.

The return path data (RPD) database 113 includes return path data that represents any data receivable at a media service provider (e.g., such as a cable television service provider, a satellite television service provider, a streaming media service provider, a content provider, etc.) via a return path to the service provider from a media consumer site. As such, return path data stored in the RPD database 113 includes at least a portion of the RPD from the STB 106. Return path data may additionally or alternatively include data from any other consumer device with network access capabilities (e.g., via a cellular network, the internet, other public or private networks, etc.). For example, return path data may include any or all of linear real time data from STB 106, guide user data from a guide server, click stream data, tuning data associated with key stream data (e.g., any click on the remote—volume, mute, etc.), viewing data associated with interactive activity (such as Video On Demand) and any other additional data (e.g., data from middleware). RPD data can additionally or alternatively be from the network (e.g., via Switched Digital software) and/or any cloud-based data (such as a remote server DVR) from the cloud. In some examples, RPD can provide insight into the media exposure associated with a larger segment of the audience population. In some examples, RPD may provide information concerning the media device(s) connected to the STB 106 reporting the RPD, such as the on/off operating state of a media device connected to the STB 106. Determining the operating state of the media device connected to the STB 106 can be important to accurately credit exposure associated with media output from the STB 106. For example, a media device connected to the STB 106 can be turned off while the STB 106 remains inadvertently or intentionally powered on and outputting media. For example, while a television may be turned off, the STB 106 remains on, given that about 10% of STBs are never turned off for over a month (e.g., approximately 30% of STBs remain on for a 24 hour period on any given day). In such examples, knowledge of the operating state of the media device can help an AME accurately credit whether media output from the STB 106 is actually being presented by the media device.

The viewer adjustment circuitry 114 performs adjustment of viewership data to compensate for undercounting and/or overcounting of co-viewers associated with a given media exposure session. For example, the viewer adjustment circuitry 114 identifies compliant households (e.g., households with compliant button-pushers or panelists who actively and accurately report viewership during a television session) and non-compliant households, as described in more detail in connection with FIG. 2. In some examples, the viewer adjustment circuitry 114 identifies eligible television sessions (e.g., TV on sessions) that indicate households where viewership can be adjusted. In some examples, the viewer adjustment circuitry 114 generates a viewership model to determine viewing sessions that can be modified (e.g., to reduce overcounting and/or undercounting of co-viewers of a media session). For example, the viewer adjustment circuitry 114 trains the viewership model using the identified compliant household data and applies the viewership model to non-compliant household data to generate an updated viewership, as shown in connection with FIGS. 10A-10D and as described in more detail in connection with FIG. 2.

Figure 2:
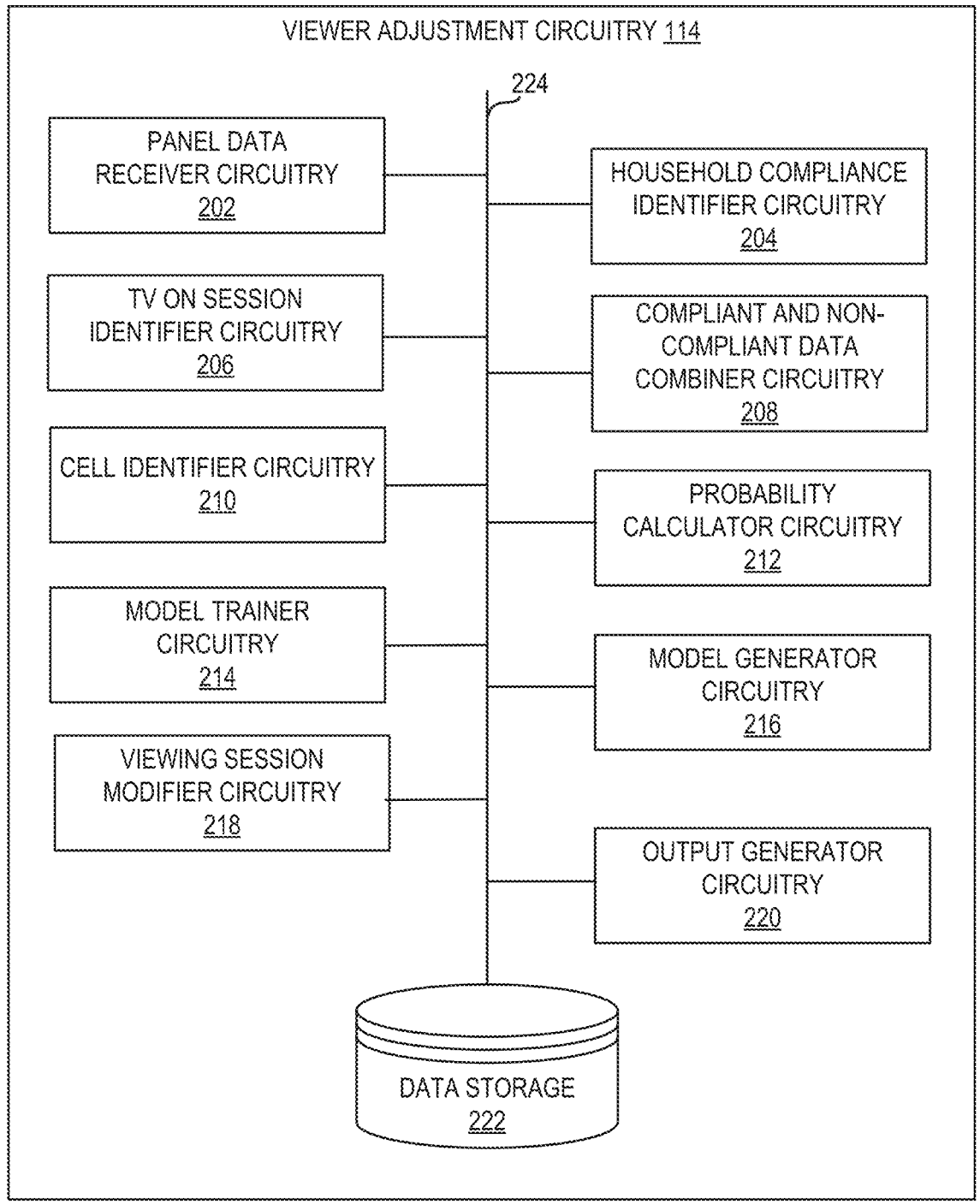
FIG. 2 is a block diagram of an example implementation of the viewer adjustment circuitry of FIG. 1.

FIG. 2 is a block diagram 200 of an example implementation of the viewer adjustment circuitry 114 of FIG. 1. The viewer adjustment circuitry 114 of FIG. 1 may be instantiated (e.g., creating an instance of, bring into being for any length of time, materialize, implement, etc.) by processor circuitry such as a central processing unit executing instructions. Additionally or alternatively, the viewer adjustment circuitry 114 of FIG. 1 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the example of FIG. 2, the viewer adjustment circuitry 114 includes example panel data receiver circuitry 202, example household compliance identifier circuitry 204, example TV on session identifier circuitry 206, example compliant and non-compliant data combiner circuitry 208, example cell identifier circuitry 210, example probability calculator circuitry 212, example model trainer circuitry 214, example model generator circuitry 216, example viewing session modifier circuitry 218, example output generator circuitry 220, and example data storage 222. In the example of FIG. 2, the panel data receiver circuitry 202, the household compliance identifier circuitry 204, the TV on session identifier circuitry 206, the compliant and non-compliant data combiner circuitry 208, the cell identifier circuitry 210, the probability calculator circuitry 212, the model trainer circuitry 214, the model generator circuitry 216, the viewing session modifier circuitry 218, the output generator circuitry 220, and/or the data storage 222 are in communication via an example bus 224.

The panel data receiver circuitry 202 receives data from the audience measurement entity (AME) 112. In some examples, the panel data receiver circuitry 202 receives data relating to user viewership and/or media exposure (e.g., length of time that a panelist viewed a television program, etc.). In some examples, the panel data receiver circuitry 202 receives data from the AME 112 and/or directly from the panel meter 108 of FIG. 1 (e.g., via the network 110) that provides information about panel meter usage (e.g., panel meter 108 usage by the panelist(s) 102). For example, panel meter usage data from the AME 112 can include dates on which the panel meter was installed, panel meter logging records indicating viewership and/or co-viewership of household members, etc. In some examples, the panel data receiver circuitry 202 receives LPM viewing data. For example, the LPM viewing data can be used to calculate model parameters (e.g., used by the model generator circuitry 216) based on household, set, person, date, quarter hour (QH) split, station, and/or playback type, including person characteristics (e.g., based on household, date, person ID, age, and/or gender). In some examples, LPM data is combined with PPM data to generate weights (e.g., combined LPM and PPM weights) based on the combined panel meter data. In examples disclosed herein, non-compliance associated with "active" viewing (e.g., button-pushing) can be remediated by using PPM-based data. For example, PPM viewing data represents "passive" viewing, allowing for comparisons that identify certain viewing patterns as potentially non-compliant. In some examples, PPM viewing data associated with a given household can be collected for 28 days to serve as prior data (e.g., before modeling is applied to identify additional and/or missing co-viewers). In some examples, the panel data receiver circuitry 202 receives LPM meter prompt data that can be used for modeling certain viewing periods as tuning without viewing (e.g., allowing for adjustment of such viewers to zero). For example, the panel data receiver circuitry 202 identifies household, set, date, station, and start-time/end-time information and joins this data with full LPM viewing data (e.g., household, set, person, date, quarter-hour split, station, playback type level data). For each record in full LPM viewing data that overlaps with LPM meter prompt data (e.g., start time/end time), the panel data receiver circuitry 202 assigns a meter prompt duration (e.g., in minutes).

The household compliance identifier circuitry 204 determines whether a household is compliant with reporting viewership data (e.g., using the panel meter 108 of FIG. 1). For example, the household compliance identifier circuitry 204 can be used to access panel validation data that identifies which households accurately report viewership during a media session. For example, households with PPMs and/or LPMs require active checking and/or logging into the audience when present during a media session (e.g., television session). However, certain types of panelists are more likely to be non-compliant (e.g., non-compliant button-pushers). Likewise, certain household members can be left out from the audience when a single person actively pushes buttons to log in. In some examples, panel validation can be performed by placing calls to households and verifying the number of individuals in the audience and the media session that is actively being viewed to check whether the household complied with the logging requirements (e.g., indicating number of audience members). As such, the call data can be compared with meter-based data originating from the panel meter 108 to determine whether button-pushing and/or logging performed by panelists is accurate, as shown in connection with FIG. 7. The household compliance identifier circuitry 204 determines household compliance based on the call data and/or any other data verifying the compliance and/or non-compliance of a given household.

The TV on session identifier circuitry 206 identifies media sessions (e.g., television sessions) that were viewed by a given household. For example, the TV on session identifier circuitry 206 identifies eligible TV on sessions to determine which media sessions can be modified in non-compliant households. For example, the TV on session identifier circuitry 206 identifies eligible TV on sessions based on the number of audience changes, the total household size, the daypart associated with the TV session, and/or the total session length. In some examples, the TV on session identifier circuitry 206 performs a comparison of LPM data with PPM data to identify the eligible TV on sessions. In some examples, the TV on session identifier circuitry 206 uses return path data (RPD) database 113 to determine the on/off status of the media presentation device 104 (e.g., television). For example, the on/off status of the media presentation device can be used to determine whether reported viewership of a television session corresponds to the times when the television session is determined to be on. Likewise, the on/off status of the media presentation device can be used to identify when a viewing session has ended (e.g., based on a TV off status) even when viewership reporting is non-compliant (e.g., panelist fails to report that the viewing session has ended).

The compliant and non-compliant data combiner circuitry 208 combines compliant data with non-compliant data. For example, the compliant and non-compliant data combiner circuitry 208 combines non-compliant household data with eligible TV on session data to determine which non-compliant data can be modified to adjust the reported viewership. In some examples, the compliant and non-compliant data combiner circuitry 208 combines the household data and TV on session data as part of an assessment of where modifications to the non-compliant data can be made based on various factors (e.g., probability of co-viewership based on historical data and/or demographics, etc.). In some examples, the compliant and non-compliant data combiner circuitry 208 outputs compliant and/or non-compliant viewing data sets based on identification of compliant and/or non-compliant data as performed using the household compliance identifier circuitry 204.

The cell identifier circuitry 210 generates data-based cells to compare similar households as part of identifying non-compliant homes that can be used for performing an adjustment for undercounting in viewership data. For example, the cell identifier circuitry 210 identifies broad data cell(s) and/or granular data cell(s) based on household information. In some examples, the cell identifier circuitry 210 identifies broad data cell(s) based on household size, presence of children in the household, and/or daypart start, where dayparting corresponds to dividing a broadcast day into several parts, with a daypart representing a block or part of the broadcast television day that has specific characteristics related to programming and/or viewer demographics. For example, the daypart represents a specific time during the day when viewers can be exposed to a media session. In some examples, the cell identifier circuitry 210 identifies granular data cell(s) based on household size, presence of children in the household, daypart start, demographics of the viewers, and/or an identification of the most viewing person (e.g., individual with highest viewership in the household). In examples disclosed herein, the cell identifier circuitry 210 identifies broad cell levels to determine where viewers (e.g., co-viewers) should be added. For example, once the cell identifier circuitry 210 identifies which cell needs to be modified, probabilities at the broad cell level and/or the granular cell level can be determined using the probability calculator circuitry 212.

The probability calculator circuitry 212 determines a probability associated with a broad data cell level and/or a granular data cell level identified using the cell identifier circuitry 210. For example, probabilities identified at the broad cell level can be used to determine households where additional viewers (e.g., co-viewers) can be added. In some examples, the probability calculator circuitry 212 can determine two levels of probabilities. For example, the probability at the broad data cell level can be expressed in accordance with Equation 1:

$$\text{Probability} = \frac{\sum \text{credited } QHs \text{ per viewer/coviewer}}{\sum \text{credited } QHs \text{ per viewer}} \quad \text{Equation 1}$$

In the example of Equation 1, credited quarter hours (QHs) per viewer represent a measurement of viewing time used to credit viewership (e.g., during a television session). The quarter hour (QH) represents a basic unit (e.g., smallest time period) for which listening and/or viewing of a media session (e.g., television session) is credited. In some examples, a media session receives credit for a quarter hour of listening when the media session receives at least five minutes of exposure within one of four fifteen minute periods in a clock hour. In examples disclosed herein, the viewer can be defined to be within a specific demographic (e.g., P2-17, P18-54, P55+) and the co-viewer can be defined to be within a specific demographic (e.g., P2-17, P18-54, P55+, none) assuming a co-viewer is present during the media session. As such, in the example of Equation 1, probability is determined based on a ratio of (1) a sum of the total number of credited QHs per viewer divided by (e.g., /) the total number of co-viewers and (2) the sum of the total number of QHs per viewer.

In examples disclosed herein, the probability computation can be used to guide the selection of viewing sessions and/or inputs (e.g., costs, targets, etc.) once the broad cell data that requires modification (e.g., viewership adjustment) is identified. For example, the probability calculator circuitry 212 identifies granular probabilities and/or odds using a granular cell definition and/or a strata definition, such that the granular probabilities can be used to determine a final probability of co-viewership. In examples disclosed herein, the granular cell definition includes household size, presence of children, start broad daypart (e.g., per viewing session), viewer demographics, most viewing person (MVP), etc. In examples disclosed herein, the strata definition includes origin, race, weekday, and/or genre. For each granular cell definition combination, the probability calculator circuitry 212 determines a granular probability by adjusting the odds to account for the strata variable by multiplying the total odds by the odds ratios for each strata level. In some examples, the probability calculator circuitry 212 determines a probability for each cell dimension combination. For example, the granular probability computation can include the following example demographics (e.g., as part of training data), where M corresponds to male and F corresponds to female: Viewer=P6-11, M12-17, M18-24, M25-34, M35-44, M45-54, M55-64, M65+, F12-17, F18-24, F25-34, F35-44, F45-54, F55-64, F65+ and Co-viewer=P6-11, M12-17, M18-24, M25-34, M35-44, M45-54, M55-64, M65+, F12-17, F18-24, F25-34, F35-44, F45-54, F55-64, F65+, None. In examples disclosed herein, the probability calculator circuitry 212 determines a final probability for a given cell-based combination (e.g., cell definition x demographics of viewer x demographics of co-viewer x origin x race x weekday x genre) based on a calculation of the total odds at the cell definition/demographic viewer/demographic co-viewer level, as shown in connection with Equation 2, where total probability is determined using Equation 1:

$$\text{Total Odds} = \frac{\text{Total Probability}}{[1 - \text{Total Probability}]} \quad \text{Equation 2}$$

In examples disclosed herein, the probability calculator circuitry 212 determines a marginal probability and marginal odds at the cell definition/viewer demographic/co-viewer demographic/strata level in accordance with Equation 3 and Equation 4, respectively. Additionally, the probability calculator circuitry 212 determines an odds ratio using the marginal odds and the total odds in accordance with Equation 5:

$$\text{Marginal Probability} = \frac{\sum \text{credited } QHs \text{ per viewer/coviewer/strata}}{\sum \text{credited } QHs \text{ per viewer/strata}} \quad \text{Equation 3}$$

$$\text{Marginal Odds} = \frac{\text{Marginal Probability}}{[1 - \text{Marginal Probability}]} \quad \text{Equation 4}$$

$$\text{Odds Ratio} = \frac{\text{Marginal Odds}}{\text{Total Odds}} \quad \text{Equation 5}$$

In some examples, the probability calculator circuitry 212 determines adjusted odds at the cell definition/viewer demographic/co-viewer demographic/strata level in accordance with Equation 6, with a final probability calculated in accordance with Equation 7:

$$\text{Adjusted Odds} = \text{Total Odds} * \text{Odds Ratio Origin} * \text{Odds Ratio Race} * \text{Odds Ratio Weekday} * \text{Odds Ratio Genre} \quad \text{Equation 6}$$

$$\text{Final Probability} = \frac{\text{Adjusted Odds}}{[1 - \text{Adjusted Odds}]} \quad \text{Equation 7}$$

For example, the probability calculator circuitry 212 determines the adjusted odds in Equation 7 based on marginal odds and total odds for each of the features identified with the strata (e.g., origin, race, weekday, and/or genre).

For example, the probability calculator circuitry 212 determines the final co-viewing probability using provided household information. As previously described, the household information can be represented using a granular cell definition, as shown in the following example: Household size=5+; presence of children=yes; start broad daypart=6 pm-10 pm; demographics viewer=P2-17; most viewing person (MVP)=yes, no co-viewer. Furthermore, example strata can be identified as follows: Origin=Hispanic; race=non-black; weekday=no; genre=child genre. Given a single viewing cell probability of 0.107, the total odds can be determined using Equation 2, such that 0.107/[1−0.107] =0.1198. The marginal probabilities can be estimated for each portion of the strata in accordance with Equation 3, such that probability based on origin=0.107, probability based on race=0.1029, probability based on weekday=0.0962, and probability based on genre=0.2468. Likewise, the marginal odds can be determined in accordance with Equation 4, such that marginal odd based on origin=0.1074/[1−0.1074]=0.1203, marginal odd based on race=0.1029/[1−0.1029]=0.1147, marginal odd based on weekday=0.0962/[1−0.0962]=0.1064, and marginal odd based on genre=0.2468/[1−0.2468]=0.3277. The odds ratios can be calculated using Equation 5, such that the odds ratio based on origin=0.1203/0.1198=1.0042, the odds ratio based on race=0.1147/0.1198=0.9574, the odds ratio based on weekday=0.1064/0.1198=0.8881, and the odds ratio based on genre=0.3277/0.1198=2.7354. Furthermore, the adjusted odds can be calculated in accordance with Equation 6 as 0.1198*1.0042*0.9574*0.8881*2.7354=0.2798 and the final co-viewership probability can be determined in accordance with Equation 7, such that 0.2798/[1−0.2798]= 0.3885. Accordingly, households that do not report co-viewership when logging is performed using a panel meter can undergo adjustment to correct for undercounting of the total audience (e.g., using the viewing session modifier circuitry 218).

The model trainer circuitry 214 performs viewership model training. For example, to generate a viewership model (e.g., using the model generator circuitry 216), the model trainer circuitry 214 identifies training data that includes compliant households. For example, the model trainer circuitry 214 uses compliant household data as learning data when training the viewership model used to perform viewership adjustments. In some examples, the model trainer circuitry 214 trains the viewership model based on return path data (RPD) on/off model-generated data (e.g., from the RPD database 113) that indicates whether the media presentation device 104 of FIG. 1 is on or off during a given media session. For example, the RPD database 113 can be used to verify household compliance and determine which household datasets can be used for model training. In some examples, the model trainer circuitry 214 trains a binary class random forest classification model, as described in connection with the model generator circuitry 216 and/or the viewing session modifier circuitry 218. For example, the random forest-based classification model produces multiple decision trees, with each tree predicting an outcome of 'View' or 'Not View' for each person at each quarter hour. For example, the viewing session modifier circuitry 218 determines an overall result by combining individual decisions and determining which result has the highest proportion of outcomes (e.g., if 8 trees predicted 'Not View' and 2 trees predicted 'View', the overall prediction would be 'Not View' for that particular person at a particular quarter hour). In some examples, the model trainer circuitry 214 trains the model using a Gridsearch methodology to determine parameters of the random forest model to use for predicting non-compliant persons. In some examples, the model trainer circuitry 214 optimizes the model's performance by testing multiple iterations of the model with changed parameters (e.g., such as a number of trees (ranging from 10 to 750), a maximum depth of each tree (ranging from 5 to 100), etc.)). For example, use of a Gridsearch methodology accounts for overfitting, permits scaling to large datasets and/or provides an indication of the importance of each feature, allowing for the identification of features that are relevant to predicting a person's viewing status in the TV on session.

The model generator circuitry 216 generates a viewership model based on training data obtained using the model trainer circuitry 214. In some examples, the model generator circuitry 216 generates the viewership model using compliant households identified using the household compliance identifier circuitry 204. In examples disclosed herein, the model generator circuitry 216 generates the viewership model to identify households that include overcounting and/or undercounting of viewers and/or co-viewers, as described in more detail in connection with FIG. 6. For example, the viewership model can be used to assess panel data to determine a probability of the household data including underreporting of viewers and/or overreporting of viewers associated with a given media session. In some examples, the viewership model determines likelihood of non-compliance based on household data (e.g., demographics, historical viewership data, RPD reporting media presentation device on/off data, etc.). In some examples, the viewership model can be generated using a neural network and/or a machine learning algorithm (e.g., binary class random forest classification model), as described in more detail in connection with the viewing session modifier circuitry 218.

The viewing session modifier circuitry 218 modifies a viewing session to remove undercounting and/or overcounting of viewers and/or co-viewers associated with a given media session. For example, the viewing session modifier circuitry 218 identifies non-compliant household data and modifies the non-compliant household data (e.g., adjusts co-viewer and/or single viewer counts and/or demographics associated with the co-viewer and/or single viewer counts) to provide updated viewership information based on the generated viewership model. For example, the viewing session modifier circuitry 218 selects viewers to remove from the audience at particular quarter hours based on a binary class random forest classification model. In some examples, the viewing session modifier circuitry 218 applies the classification model at a household, set, TV on session, quarter hour and/or at a person level to determine whether a particular person has been non-compliant with removing themselves from the audience (e.g., causing the data to suggest that the person is still in the audience). For example, the model predicts at which quarter hours the person should be removed from the dataset and is predicted to be no longer in the audience. In some examples, the viewing session modifier circuitry 218 only applies the model to quarter hours after a person has joined the viewing session and/or to those sessions displaying co-viewing (e.g., 2 or more persons viewing throughout the TV on session).

In some examples, the classification model is trained using the model trainer circuitry 214. For example, the model trainer circuitry 214 trains the model on the TV on sessions from audiences determined to be compliant (e.g., providing information about the quarter hour at which the individuals left the audience according to the compliant data). To train the model, the model trainer circuitry 214 simulates non-compliant data based on the training set, changing any quarter hours where the audience member left, to instead indicate that the audience member remained but did not correctly remove themselves (e.g., using the panel meter). Based on the compliant data, when an individual does leave the audience, the model trainer circuitry 214 compares model-based predictions to the compliant data. In some examples, the classification model (e.g., binary class random forest model) uses additional features pertaining to the set, TV on session, and/or audience collectively, including individual viewers contributing to the prediction of when a non-compliant individual leaves a given session. Such additional features include, but are not limited to, the TV on session length, the time of day (dayparts) in which the TV on session occurs, the start time of the TV on session, distinct viewers per session, time since last known audience change, person ID, person gender, and/or age demographics, as shown in more detail in connection with FIG. 8A.

In some examples, the viewing session modifier circuitry 218 updates viewer and/or co-viewer numbers, including co-viewer demographics. In some examples, the viewing session modifier circuitry 218 compares non-compliant data distribution before and after the non-compliant data is modified using the viewership model generated with the model generator circuitry 216. For example, the comparison can be used to assess changes to the non-compliant data distribution after adjustment using the viewing session modifier circuitry 218, and the similarity of the distributions between the known compliant data and the modified non-compliant data.

Figure 8A:
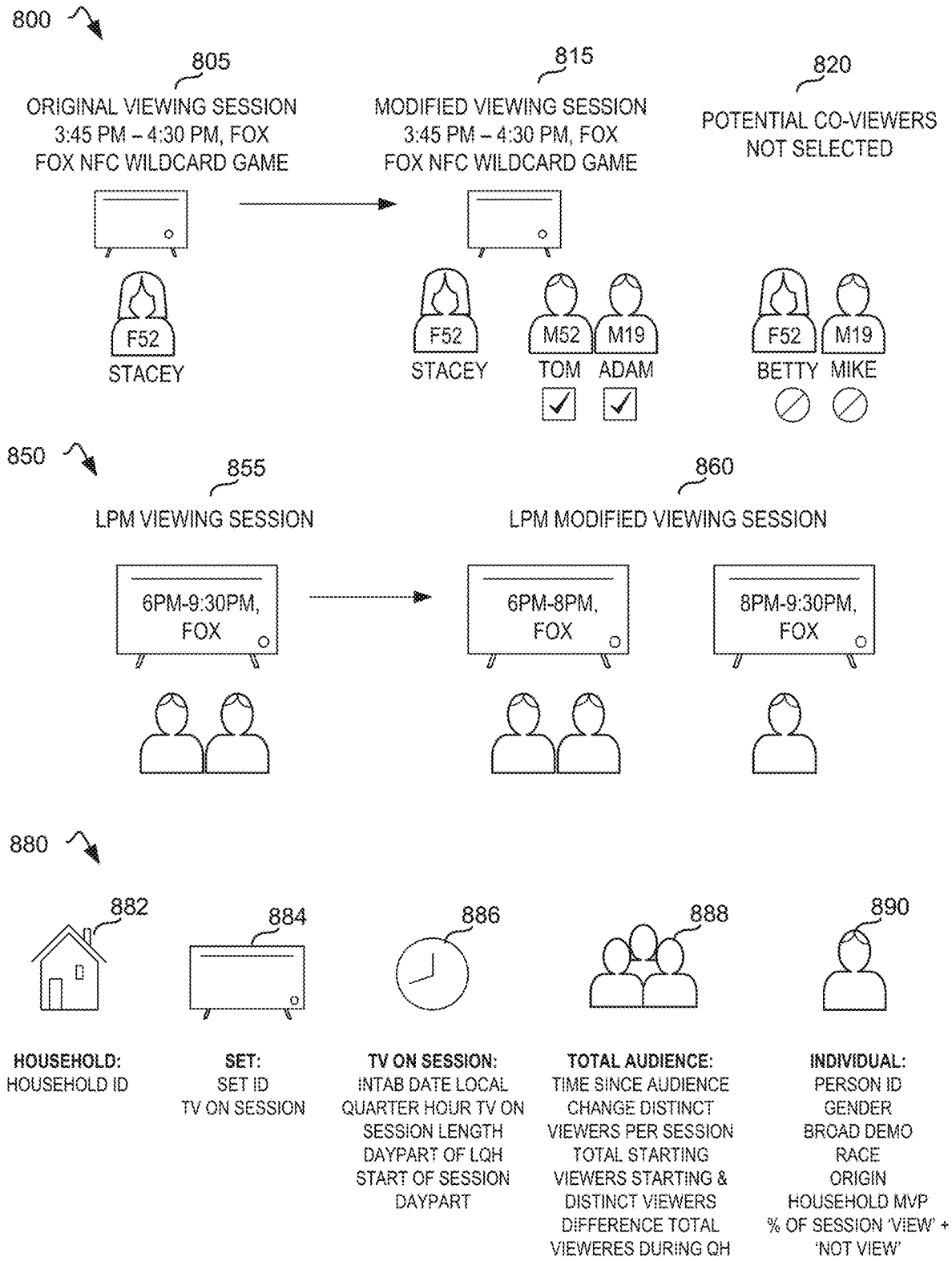
FIG. 8A illustrates example identification of non-selected co-viewers, a local people meter (LPM) modified viewing session, and household features used to determine likelihood of button-pushing compliance.
Figure 8B:
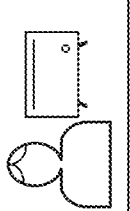
FIG. 8B illustrates example mixed integer programming (MIP) for co-viewer assignment.

In some examples, the viewing session modifier circuitry 218 modifies a viewing session by assigning co-viewers using mixed integer programming (MIP), as shown in connection with FIG. 8B. For example, the probability calculator circuitry 212 assigns co-viewing probability to each potential co-viewer, such that the probability can be used to predict co-viewer(s) based on MIP. In some examples, the viewing session modifier circuitry 218 adds potential co-viewers to each selected viewing session, adds potential co-viewer probability of co-viewing with the main viewer (e.g., MIP cost), and/or ranks potential co-viewers in terms of viewing behavior, age, and/or gender, resulting in viewing sessions with ranked potential co-viewers and probabilities of co-viewership, as shown in more detail in connection with FIG. 8B. In some examples, the viewing session modifier circuitry 218 uses co-viewing behavior in compliant LPM viewing data to compute MIP targets per cell. For example, the MIP targets per cell represent co-viewing distributions that non-compliant viewing distributions are moved towards. In some examples, the viewing session modifier circuitry 218 identifies (1) selected viewing sessions with ranked potential co-viewers and probabilities and (2) MIP target distributions, converts probabilities to MIP cost and assigns one or more co-viewers to each viewing session. In some examples, the output generator circuitry 220 outputs the selected viewing sessions with additional co-viewers.

The output generator circuitry 220 outputs modified household viewership data. For example, the output generator circuitry 220 outputs data indicative of changes to the non-compliant household viewership reporting data before and after modification using the viewing session modifier circuitry 218, as shown in connection with FIGS. 10A-10D. In some examples, the output generator circuitry 220 outputs updates to the demographics associated with viewers and/or co-viewers. In some examples, the output generator circuitry 220 compares non-compliant data that has been modified to correct undercounting and/or overcounting to compliant data identified using the household compliance identifier circuitry 204, the comparison used to determine how closely the distribution of the adjusted non-compliant data matches the distribution of the known compliant data. In some examples, the output generator circuitry 220 outputs impact ratings and/or impressions based on input(s) of selected viewing sessions with additional co-viewers, modeled viewing data, PPM viewing data, and/or combined LPM and PPM weights.

The data storage 222 can be used to store any information associated with the panel data receiver circuitry 202, the household compliance identifier circuitry 204, the TV on session identifier circuitry 206, the compliant and non-compliant data combiner circuitry 208, the cell identifier circuitry 210, the probability calculator circuitry 212, the model trainer circuitry 214, the model generator circuitry 216, the viewing session modifier circuitry 218, and/or the output generator circuitry 220. The example data storage 222 of the illustrated example of FIG. 2 can be implemented by any memory, storage device and/or storage disc for storing data such as flash memory, magnetic media, optical media, etc. Furthermore, the data stored in the example data storage 222 can be in any data format such as binary data, comma delimited data, tab delimited data, structured query language (SQL) structures, image data, etc.

In some examples, the apparatus includes means for receiving panel data. For example, the means for receiving panel data may be implemented by panel data receiver circuitry 202. In some examples, the panel data receiver circuitry 202 may be instantiated by processor circuitry such as the example processor circuitry 1212 of FIG. 12. For instance, the panel data receiver circuitry 202 may be instantiated by the example microprocessor 1300 of FIG. 13 executing machine executable instructions such as those implemented by at least block 302 of FIG. 3. In some examples, the panel data receiver circuitry 202 may be instantiated by hardware logic circuitry, which may be implemented by an ASIC, XPU, or the FPGA circuitry 1400 of FIG. 14 structured to perform operations corresponding to the machine readable instructions. Additionally or alternatively, the panel data receiver circuitry 202 may be instantiated by any other combination of hardware, software, and/or firmware. For example, the panel data receiver circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying household compliance. For example, the means for identifying household compliance may be implemented by household compliance identifier circuitry 204. In some examples, the household compliance identifier circuitry 204 may be instantiated by processor circuitry such as the example processor circuitry 1212 of FIG. 12. For instance, the household compliance identifier circuitry 204 may be instantiated by the example microprocessor 1300 of FIG. 13 executing machine executable instructions such as those implemented by at least blocks 405, 410 of FIG. 4. In some examples, the household compliance identifier circuitry 204 may be instantiated by hardware logic circuitry, which may be implemented by an ASIC, XPU, or the FPGA circuitry 1400 of FIG. 14 structured to perform operations corresponding to the machine readable instructions. Additionally or alternatively, the household compliance identifier circuitry 204 may be instantiated by any other combination of hardware, software, and/or firmware. For example, the household compliance identifier circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying an eligible television session. For example, the means for identifying an eligible television session may be implemented by TV on session identifier circuitry 206. In some examples, the TV on session identifier circuitry 206 may be instantiated by processor circuitry such as the example processor circuitry 1212 of FIG. 12. For instance, the TV on session identifier circuitry 206 may be instantiated by the example microprocessor 1300 of FIG. 13 executing machine executable instructions such as those implemented by at least block 425 of FIG. 4. In some examples, the TV on session identifier circuitry 206 may be instantiated by hardware logic circuitry, which may be implemented by an ASIC, XPU, or the FPGA circuitry 1400 of FIG. 14 structured to perform operations corresponding to the machine readable instructions. Additionally or alternatively, the TV on session identifier circuitry 206 may be instantiated by any other combination of hardware, software, and/or firmware. For example, the TV on session identifier circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for combining compliant and non-compliant data. For example, the means for combining compliant and non-compliant data may be implemented by compliant and non-compliant data combiner circuitry 208. In some examples, the compliant and non-compliant data combiner circuitry 208 may be instantiated by processor circuitry such as the example processor circuitry 1212 of FIG. 12. For instance, the compliant and non-compliant data combiner circuitry 208 may be instantiated by the example microprocessor 1300 of FIG. 13 executing machine executable instructions such as those implemented by at least block 430 of FIG. 4. In some examples, the compliant and non-compliant data combiner circuitry 208 may be instantiated by hardware logic circuitry, which may be implemented by an ASIC, XPU, or the FPGA circuitry 1400 of FIG. 14 structured to perform operations corresponding to the machine readable instructions. Additionally or alternatively, the compliant and non-compliant data combiner circuitry 208 may be instantiated by any other combination of hardware, software, and/or firmware. For example, the compliant and non-compliant data combiner circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a broad cell data level. For example, the means for identifying a broad cell data level may be implemented by cell identifier circuitry 210. In some examples, the cell identifier circuitry 210 may be instantiated by processor circuitry such as the example processor circuitry 1212 of FIG. 12. For instance, the cell identifier circuitry 210 may be instantiated by the example microprocessor 1300 of FIG. 13 executing machine executable instructions such as those implemented by at least blocks 505, 510 of FIG. 5. In some examples, the cell identifier circuitry 210 may be instantiated by hardware logic circuitry, which may be implemented by an ASIC, XPU, or the FPGA circuitry 1400 of FIG. 14 structured to perform operations corresponding to the machine readable instructions. Additionally or alternatively, the cell identifier circuitry 210 may be instantiated by any other combination of hardware, software, and/or firmware. For example, the cell identifier circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for calculating a probability. For example, the means for calculating a probability may be implemented by probability calculator circuitry 212. In some examples, the probability calculator circuitry 212 may be instantiated by processor circuitry such as the example processor circuitry 1212 of FIG. 12. For instance, the probability calculator circuitry 212 may be instantiated by the example microprocessor 1300 of FIG. 13 executing machine executable instructions such as those implemented by at least blocks 515, 520 of FIG. 5. In some examples, probability calculator circuitry 212 may be instantiated by hardware logic circuitry, which may be implemented by an ASIC, XPU, or the FPGA circuitry 1400 of FIG. 14 structured to perform operations corresponding to the machine readable instructions. Additionally or alternatively, the probability calculator circuitry 212 may be instantiated by any other combination of hardware, software, and/or firmware. For example, the probability calculator circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for training a model. For example, the means for training a model may be implemented by model trainer circuitry 214. In some examples, the model trainer circuitry 214 may be instantiated by processor circuitry such as the example processor circuitry 1212 of FIG. 12. For instance, the model trainer circuitry 214 may be instantiated by the example microprocessor 1300 of FIG. 13 executing machine executable instructions such as those implemented by at least block 610 of FIG. 6. In some examples, the model trainer circuitry 214 may be instantiated by hardware logic circuitry, which may be implemented by an ASIC, XPU, or the FPGA circuitry 1400 of FIG. 14 structured to perform operations corresponding to the machine readable instructions. Additionally or alternatively, the model trainer circuitry 214 may be instantiated by any other combination of hardware, software, and/or firmware. For example, the model trainer circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating a model. For example, the means for generating a model may be implemented by model generator circuitry 216. In some examples, the model generator circuitry 216 may be instantiated by processor circuitry such as the example processor circuitry 1212 of FIG. 12. For instance, the model generator circuitry 216 may be instantiated by the example microprocessor 1300 of FIG. 13 executing machine executable instructions such as those implemented by at least block 315 of FIG. 3. In some examples, the model generator circuitry 216 may be instantiated by hardware logic circuitry, which may be implemented by an ASIC, XPU, or the FPGA circuitry 1400 of FIG. 14 structured to perform operations corresponding to the machine readable instructions. Additionally or alternatively, the model generator circuitry 216 may be instantiated by any other combination of hardware, software, and/or firmware. For example, the model generator circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for modifying a viewing session. For example, the means for modifying a viewing session may be implemented by viewing session modifier circuitry 218. In some examples, the viewing session modifier circuitry 218 may be instantiated by processor circuitry such as the example processor circuitry 1212 of FIG. 12. For instance, the viewing session modifier circuitry 218 may be instantiated by the example microprocessor 1300 of FIG. 13 executing machine executable instructions such as those implemented by at least block 615 of FIG. 6. In some examples, the viewing session modifier circuitry 218 may be instantiated by hardware logic circuitry, which may be implemented by an ASIC, XPU, or the FPGA circuitry 1400 of FIG. 14 structured to perform operations corresponding to the machine readable instructions. Additionally or alternatively, the viewing session modifier circuitry 218 may be instantiated by any other combination of hardware, software, and/or firmware. For example, the viewing session modifier circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for generating an output. For example, the means for generating an output may be implemented by output generator circuitry 220. In some examples, the output generator circuitry 220 may be instantiated by processor circuitry such as the example processor circuitry 1212 of FIG. 12. For instance, the output generator circuitry 220 may be instantiated by the example microprocessor 1300 of FIG. 13 executing machine executable instructions such as those implemented by at least block 620 of FIG. 6. In some examples, the output generator circuitry 220 may be instantiated by hardware logic circuitry, which may be implemented by an ASIC, XPU, or the FPGA circuitry 1400 of FIG. 14 structured to perform operations corresponding to the machine readable instructions. Additionally or alternatively, the output generator circuitry 220 may be instantiated by any other combination of hardware, software, and/or firmware. For example, the output generator circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the viewer adjustment circuitry 114 of FIGS. 1 and/or 2 is illustrated in FIG. 2, one or more of the elements, processes, and/or devices illustrated in FIG. 2 may be combined, divided, re-arranged, omitted, eliminated, and/or implemented in any other way. Further, the panel data receiver circuitry 202, the household compliance identifier circuitry 204, the TV on session identifier circuitry 206, the compliant and non-compliant data combiner circuitry 208, the cell identifier circuitry 210, the probability calculator circuitry 212, the model trainer circuitry 214, the model generator circuitry 216, the viewing session modifier circuitry 218, the output generator circuitry 220 and/or, more generally, the example viewer adjustment circuitry 114 of FIG. 1, may be implemented by hardware, software, firmware, and/or any combination of hardware, software, and/or firmware. Thus, for example, any of the panel data receiver circuitry 202, the household compliance identifier circuitry 204, the TV on session identifier circuitry 206, the compliant and non-compliant data combiner circuitry 208, the cell identifier circuitry 210, the probability calculator circuitry 212, the model trainer circuitry 214, the model generator circuitry 216, the viewing session modifier circuitry 218, the output generator circuitry 220 and/or, more generally, the example viewer adjustment circuitry 114 of FIG. 1, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example viewer adjustment circuitry 114 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the viewer adjustment circuitry 114 are shown in FIGS. 3-6. The machine readable instructions may be one or more executable programs or portion(s) of an executable program for execution by processor circuitry, such as the processor circuitry 1212 shown in the example processor platform 1200 discussed below in connection with FIG. 12, and/or the example processor circuitry discussed below in connection with FIGS. 13 and/or 14. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program(s) are described with reference to the flowcharts illustrated in FIGS. 3, 4, 5, and/or 6, many other methods of implementing the example viewer adjustment circuitry 114 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4 and/or 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second", etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
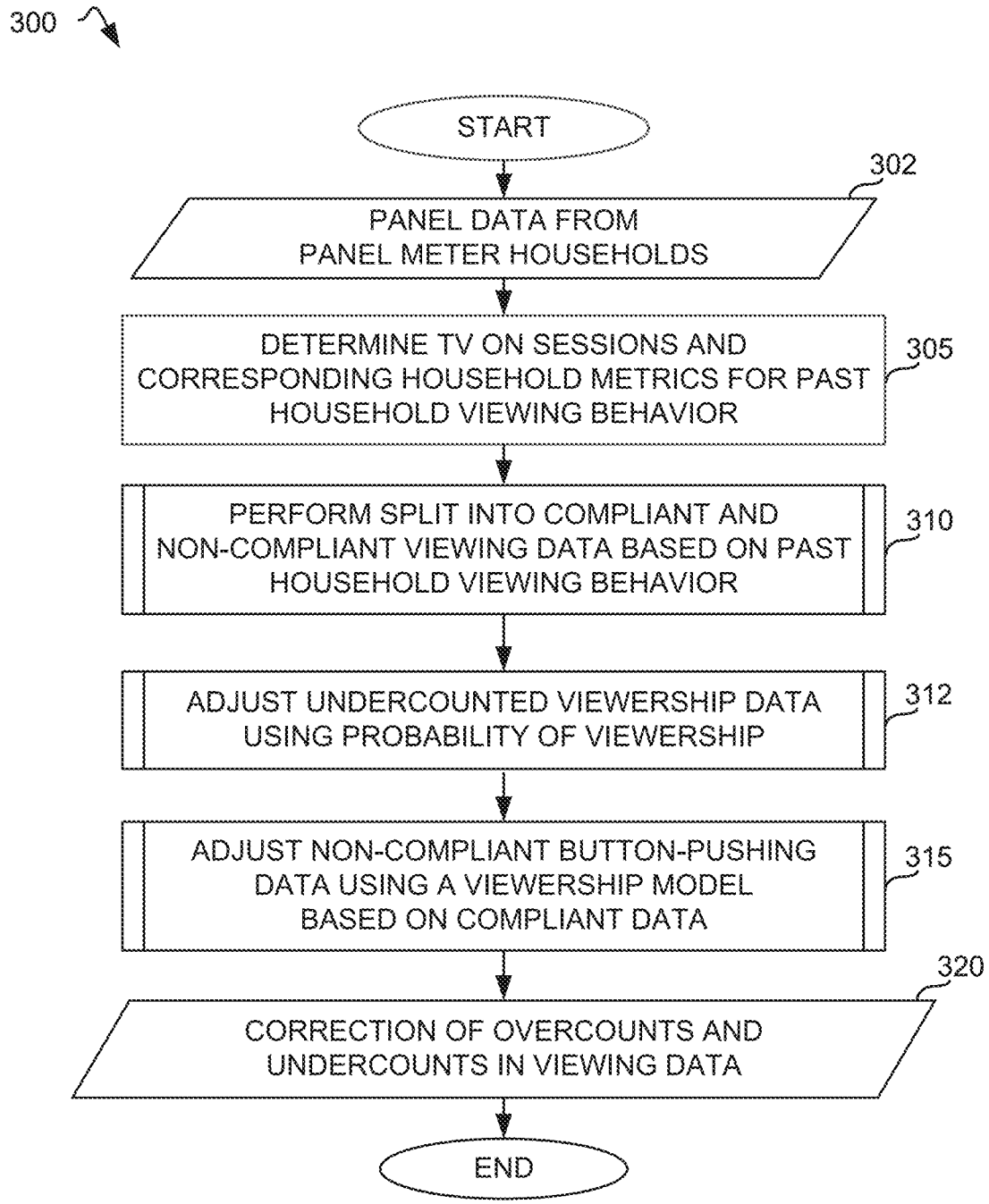
FIG. 3 is a flowchart representative of example machine readable instructions and/or example operations that may be executed by example processor circuitry to implement the viewer adjustment circuitry of FIG. 1.

FIG. 3 is a flowchart representative of example machine readable instructions and/or operations 300 that may be executed and/or instantiated by processor circuitry to implement the example viewer adjustment circuitry 114 of FIG. 1. The machine readable instructions and/or the operations 300 of FIG. 3 begin at block 302 at which the panel data receiver circuitry 202 receives panel data from panel meter households (block 302). For example, the panel data from panel meter households includes data received from the panel meter(s) 103 installed in the households of panelist(s). In some examples, the panel data receiver circuitry 202 receives panel data including the demographics of the viewer(s), the number of reported co-viewers, the media session(s) associated with the views, and/or other data received by the audience measurement entity (AME) 112. In some examples, the panel data receiver circuitry 202 determines media sessions (e.g., TV on sessions) and corresponding household metrics (e.g., number of co-viewers, viewer demographics, etc.) associated with a household based on past household viewing behavior (block 305). The household compliance identifier circuitry 204 performs a split of panel data identified using the panel data receiver circuitry 202 into compliant and non-compliant viewing data based on past household viewing behavior (block 310), as described in more detail in connection with FIG. 4. For example, the household compliance identifier circuitry 204 identifies compliant and non-compliant household data to use compliant household data for training of a viewership model that can correct for undercounting and/or overcounting in the panel meter data. Furthermore, the TV on session identifier circuitry 206 identifies eligible media sessions that can be modified in non-compliant households, as described in connection with FIG. 4. In some examples, the compliant and non-compliant data combiner circuitry 208 combines the identified compliant and non-compliant household data to generate compliant and non-compliant data viewing sets that can be used for the training and/or development of the viewership model. In examples disclosed herein, the viewer adjustment circuitry 114 adjusts undercounted viewership data using a probability of viewership (block 312). For example, the cell identifier circuitry 210 identifies broad cell data level(s) and/or granular cell data level(s) that can be used to determine a probability of viewership using the probability calculator circuitry 212, as described in more detail in connection with FIG. 5. Furthermore, the viewer adjustment circuitry 114 adjusts non-compliant button-pushing data using a viewership model based on compliant data (block 315). For example, the model trainer circuitry 214 trains the viewership model (e.g., generated using the model generator circuitry 216) based on compliant household data, including household demographics. The viewing session modifier circuitry 218 modifies viewership household data to remove undercounting and/or overcounting based on the viewership model. In examples disclosed herein, the output generator circuitry 220 subsequently outputs the corrections of undercounts and/or overcounts in viewing data (block 320).

Figure 4:
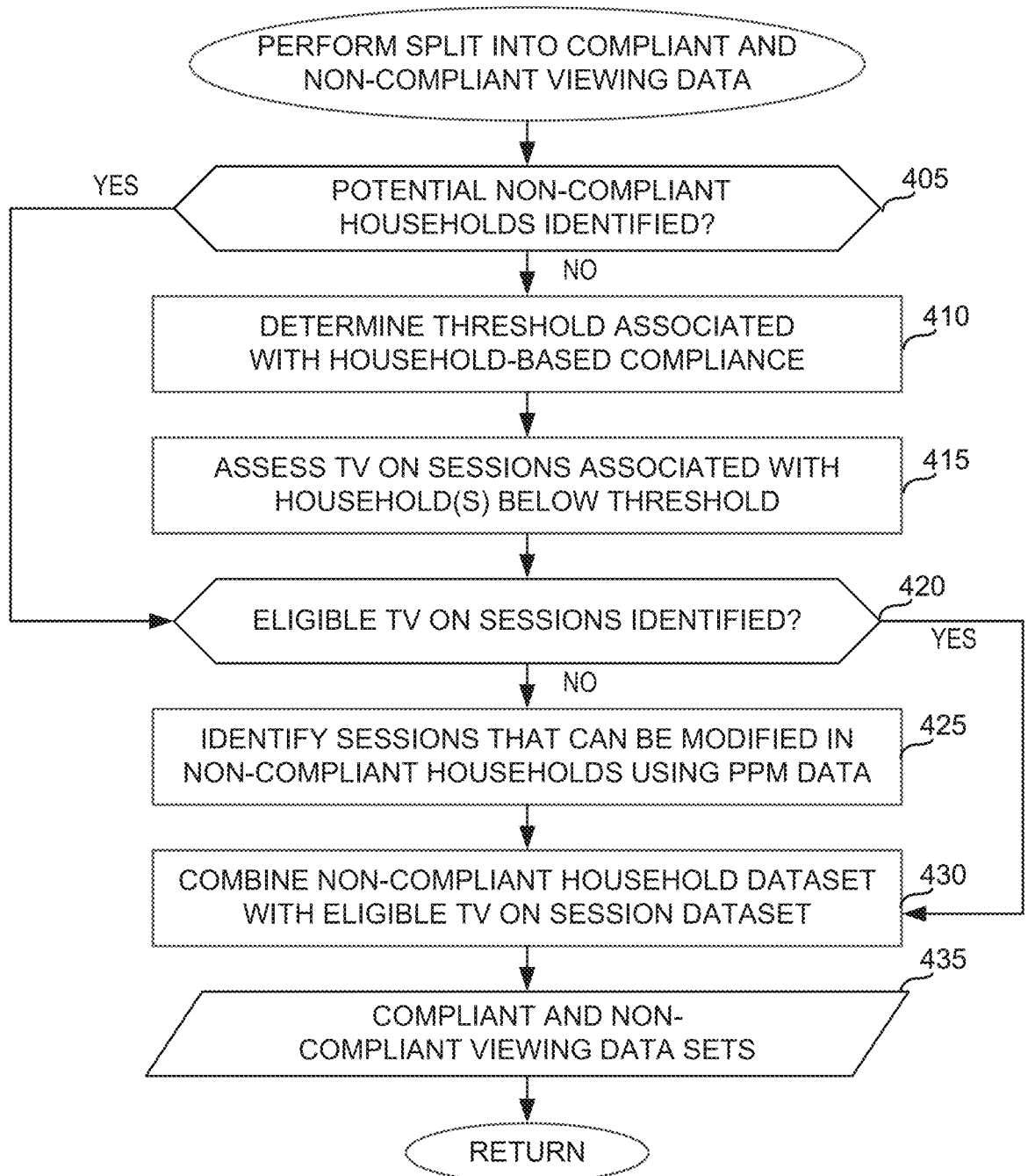
FIG. 4 is a flowchart representative of example machine readable instructions and/or example operations that may be executed by example processor circuitry to perform a split into compliant and non-compliant viewing data using the viewer adjustment circuitry of FIG. 1.

FIG. 4 is a flowchart representative of example machine readable instructions and/or example operations 310 that may be executed by example processor circuitry to perform a split into compliant and non-compliant viewing data using the viewer adjustment circuitry 114 of FIG. 1. In the example of FIG. 4, the household compliance identifier circuitry 204 determines whether potential non-compliant households have been identified (block 405). For example, the household compliance identifier circuitry 204 determines whether non-compliant households have been identified from panel meter data received using the panel data receiver circuitry 202. If non-compliant households have not been identified from the received data, the household compliance identifier circuitry 204 determines a threshold associated with household-based compliance (block 410). For example, the household compliance identifier circuitry 204 determines percentiles for household-level metrics to obtain a corresponding threshold. In some examples, the household-level metrics can be defined across any period (e.g., a 28-day period). In some examples, the household-level metrics can include: 1) a household audience change rate (e.g., number of audience member changes over the number of quarter hours tuned), 2) a household audience add rate (e.g., number of audience members additions over the number of quarter hours tuned), 3) a no audience change session percentage (e.g., percentage of TV on sessions where duration of the session is greater than or equal to 60 minutes with no audience change), 4) a one viewer percentage (e.g., percentage of TV on sessions where viewer count is equal to 1 and the minimum threshold for total TV on sessions for quarter hours is set to 30), 5) a household most viewing person (MVP) percentage (e.g., percentage of total viewing quarter hours by the most viewing person), and 6) household members not viewing (e.g., calculate a number of days where a number of distinct viewers is less than the household size over a total number of days with at least 7 total days counted), as shown in more detail in connection with FIG. 11.

In some examples, the household compliance identifier circuitry 204 calculates percentiles for the household level metric to obtain a corresponding threshold based on a size of the household and the presence of children in the household, such that a percentile and/or threshold is calculated for each metric listed in connection with the household level metrics described, including a threshold at which no metric results in 100% compliant data. In some examples, the household compliance identifier circuitry 204 flags each household-level metric that falls below a calculated threshold for compliance. As such, the household compliance identifier circuitry 204 can flag any household with one or more metrics that fall below the calculated threshold for compliance as a potentially non-compliant household.

Once non-compliant households are identified using the household compliance identifier circuitry 204, the TV on session identifier circuitry 206 identifies TV on sessions associated with households below a given compliance threshold (e.g., non-compliant households) (block 415). For example, the TV on session identifier circuitry 206 identifies TV on sessions based on one of the following: 1) TV on session length (e.g., less than 60 minutes, 1-2 hours, more than 5 hours, etc.), 2) number of starting viewers during the TV on session (e.g., 1 viewer, 2+ viewers, etc.), 3) change in audience, 4) drop in audience, and 5) addition in audience. In some examples, the TV on session identifier circuitry 206 flags TV on sessions as potentially non-compliant for households that have been flagged as potentially non-compliant when the following criteria are met: 1) TV on session length is greater than or equal to two hours in length, 2) TV on session has zero audience changes, and 3) TV on session has only one viewer. In some examples, the TV on session identifier circuitry 206 identifies eligible TV on session that can be modified (block 420). For example, if TV on sessions eligible for modification have not been identified, the TV on session identifier circuitry 206 identifies sessions that can be modified in non-compliant households using people panel meter (PPM) data (block 425). For example, the TV on session identifier circuitry 206 creates a session level data set based on a given household, TV session, TV session length, household size, and/or TV session daypart start, where the metric of interest is the number of TV on session audience changes. In some examples, the TV on session identifier circuitry 206 calculates percentiles for a given session level to obtain a corresponding threshold based on PPM data. For example, the TV on session identifier circuitry 206 uses a tenth percentile from PPM data to assign potentially non-compliant TV on sessions in local people meter (LPM) data. For example, LPM data can be obtained from meters directly connected to all television sets in a household, such that members of the household are assigned a button and periodically engage with the meter during the TV session. PPM data, on the other hand, corresponds to data measuring in-home tuning for audio and local television and can include data originating from devices such as wristbands, pendants or clips. For example, the PPM detects hidden audio tones within a given TV session (e.g., audio session) to log when the viewer is exposed to the TV session. In some examples, the TV on session identifier circuitry 206 joins the PPM-based threshold determined from percentiles back to the session level data set, such that TV on sessions can be flagged as potentially non-compliant when the number of session audience changes is less than a given PPM-based session audience change threshold.

In examples disclosed herein, the compliant and non-compliant data combiner circuitry 208 combines non-compliant household datasets with eligible TV on session datasets (block 430). For examples, the compliant and non-compliant data combiner circuitry 208 combines a first dataset corresponding to non-compliant households with a second dataset corresponding to eligible TV on sessions to create a flagging of non-compliant data. For example, if a session is flagged as non-compliant in the second dataset, then the final dataset (e.g., combined dataset) is flagged as potentially non-compliant, as shown in more detail in connection with FIG. 11. In the example of FIG. 4, the compliant and non-compliant data combiner circuitry 208 outputs the compliant and non-compliant viewing data sets (block 435).

Figure 5:
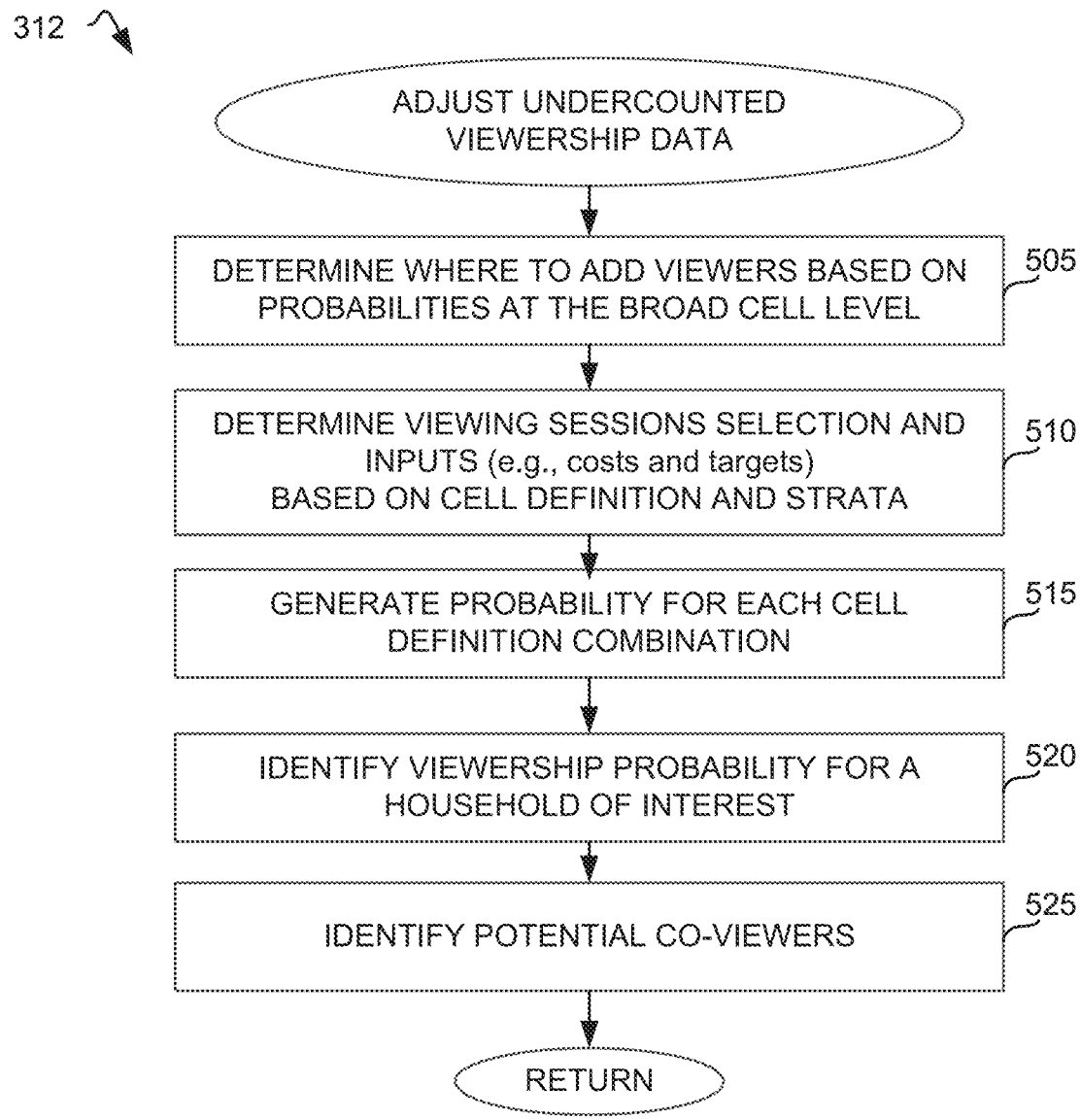
FIG. 5 is a flowchart representative of example machine readable instructions and/or example operations that may be executed by example processor circuitry to adjust undercounted viewership data using the viewer adjustment circuitry of FIG. 1.

FIG. 5 is a flowchart representative of example machine readable instructions and/or example operations 312 that may be executed by example processor circuitry to adjust undercounted viewership data using the viewer adjustment circuitry 114 of FIG. 1. In the example of FIG. 5, the cell identifier circuitry 210 determines where to add viewers based on probabilities at the broad cell level (block 505). For example, the cell identifier circuitry 210 identifies a broad cell data level within a given data set based on household size, presence of children, and/or a daypart start, where a co-viewership probability at the broad-cell level can be determined in accordance with Equation 1. In the example of FIG. 5, the cell identifier circuitry 210 determines viewing session selection(s) and input(s) (e.g., costs and/or targets) based on cell definition and/or strata (block 510). For example, the probability calculator circuitry 212 uses a probability computation to determine viewing session selection(s) using a given granular cell definition (e.g., household size, presence of children, most viewing person, etc.) and strata (e.g., origin, race, weekday, genre). For example, the probability calculator circuitry 212 determines odds, marginal probabilities, and adjusted probabilities in accordance with Equations 2-7, as described in connection with FIG. 2. As such, the probability calculator circuitry 212 generates a probability for each cell definition combination (block 515). The probability calculator circuitry 212 determines a final probability of co-viewership for a household of interest (block 520), which can be used to identify potential co-viewers associated with a given household that have not been included in the original household count (e.g., correct for undercounted viewership data) (block 525).

Figure 6:
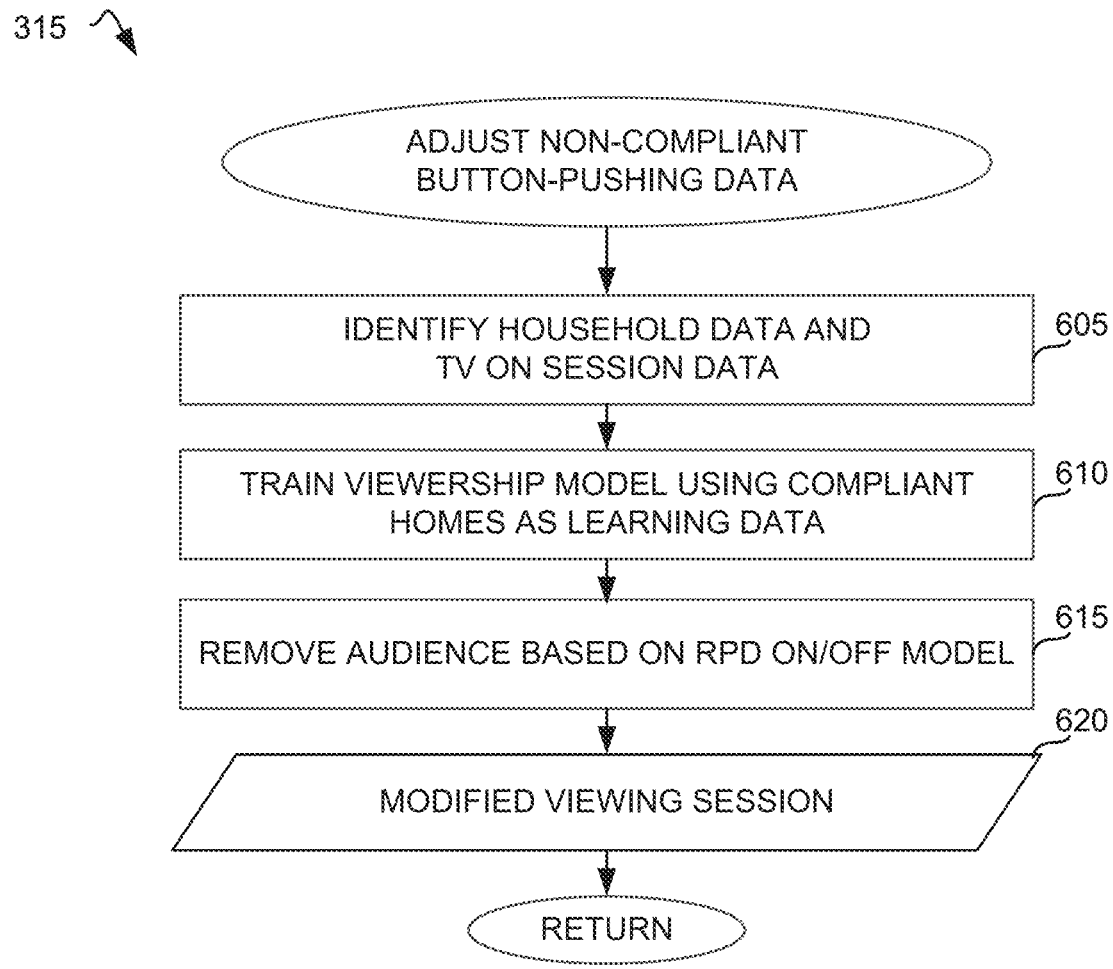
FIG. 6 is a flowchart representative of example machine readable instructions and/or example operations that may be executed by example processor circuitry to adjust non-compliant button-pushing data using the viewer adjustment circuitry of FIG. 1.

FIG. 6 is a flowchart representative of example machine readable instructions and/or example operations 315 that may be executed by example processor circuitry to adjust non-compliant button-pushing data using the viewer adjustment circuitry 114 of FIG. 1. In the example of FIG. 6, the model trainer circuitry 214 identifies household data and/or TV on session data based on output generated using the household compliance identifier circuitry 204, TV on session identifier circuitry 206, and/or compliant and non-compliant data combiner circuitry 208 (block 605). In some examples, the model trainer circuitry 214 trains a viewership model generated using the model generator circuitry 216. For example, the model trainer circuitry 214 trains the viewership model using compliant homes as learning data (block 610). Once the viewership model is trained using compliant household data, the viewing session modifier circuitry 218 removes audience members based on an RPD on/off model (e.g., using RPD database 113 of FIG. 1), as shown in connection with FIG. 9 (block 615). For example, the viewing session modifier circuitry 218 modifies a local people meter (LPM) viewing session based on the RPD on/off data which indicates whether the media presentation device 104 of FIG. 1 is on or off at the time that the LPM records a media session. As such, viewership overcounting can occur when a panelist stops viewing the media session but does not push buttons to indicate that the viewership is over. The viewership model corrects for overcounting and/or incorrect reporting of viewership using the RPD inputs received in connection with the media presentation device 104 of FIG. 1. The output generator circuitry 220 outputs the modified viewing session with adjustments to non-compliant reporting (e.g., non-compliant button pushing data) (block 620).

Figure 7:
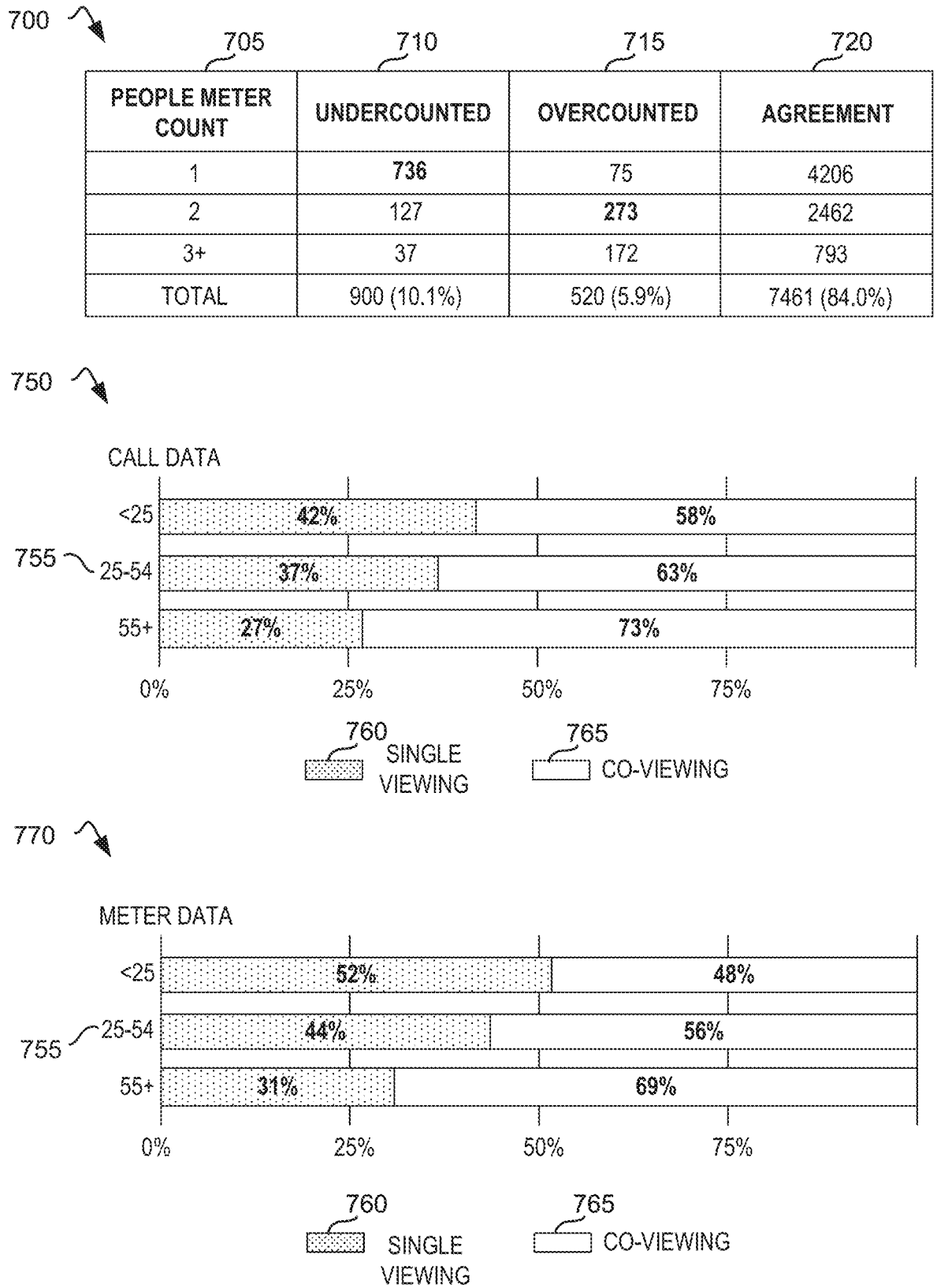
FIG. 7 illustrates example data without viewer adjustment, including undercounting and overcounting resulting from button-pushing non-compliance of household members in a household with a meter.

FIG. 7 illustrates example in-panel validation data 700, 750, 770 without viewer adjustment, including undercounting and overcounting resulting from button-pushing non-compliance of household members in a household with a meter. In the example of FIG. 7, in-panel validation indicates that undercounting occurs more frequently than overcounting, with approximately 16% of call data including some button-pushing non-compliance among family members. For example, in-panel validation data 700 includes a people meter count 705, total number of undercounted viewers 710, total number of overcounted viewers 715, and an agreement in the counts 720. In the example of in-panel validation data 700, undercounting occurs for ~10% in the reported data, overcounting occurs for ~6% in the reported data, with an agreement between call-based data and reported data for ~84% of time. For example, in-panel validation data 750 shows call data obtained during a media viewing session to determine whether panel meter data corresponds to answers provided via a phone call initiated to collect viewership and/or demographics data. For example, in-panel validation data 750, 770 includes viewership demographics 755 (e.g., age of <25, 25-54, 55+, etc.) for single viewing 760 and co-viewing 765. While in-panel validation data 750 corresponds to call data, in-panel validation data 770 corresponds to meter data, allowing for a comparison of the difference between reported and actual viewership for single viewing and co-viewing. Based on the in-panel validation data 770, a viewership model can be expected to increase ratings, with a greater increase for younger demographics and ethnic homes. In examples disclosed herein, the viewer adjustment circuitry 114 addresses both instances of undercounting and overcounting present in reported panel meter data.

FIG. 8A illustrates example identification of non-selected co-viewers 800, a local people meter (LPM) modified viewing session 850, and household features 880 used to determine likelihood of button-pushing compliance. For example, the non-selected co-viewers 800 can be added using the viewer adjustment circuitry 114 of FIG. 1, as described in connection with FIG. 5. For example, an original viewing session 805 includes a specific genre and a specific viewing daypart (e.g., quarter hours viewed), with a single reported viewer (e.g., Stacey, Female, 52 years of age). The viewer adjustment circuitry 114 outputs a modified viewing session 815, including additional viewers (e.g., Tom and Adam) and indicating potential co-viewers that were not selected 820 (e.g., Berry and Mike). In the example of FIG. 8A, the local people meter (LPM) modified viewing session 850 includes an original LPM viewing session 855 and a modified LPM viewing session 860. For example, the viewer adjustment circuitry 114 of FIG. 1 modifies the viewing session to show that two household members viewed the media session from 6-8 PM and only one household member viewed the remainder of the media session from 8-9:30 PM. In the example of FIG. 8A, household features 880 used to determine likelihood of button-pushing compliance are shown, including household data 882 (e.g., household identification), media presentation device data 884 (e.g., set identification, TV on session), TV on session data 886 (e.g., quarter hour, TV on session length, etc.), total audience data 888 (e.g., time since audience change, distinct viewers per session, etc.), and individual data 890 (e.g., person identifier, gender, demographics, etc.).

FIG. 8B illustrates example mixed integer programming (MIP) 890 for co-viewer assignment, as described in connection with the viewing session modifier circuitry 218. For example, selected viewing session(s) 892 include ranked potential co-viewers 894 with MIP cost corresponding to a potential co-viewer probability of co-viewing with a main viewer. The viewing session(s) further include probabilities of co-viewership 898 based on the ranked potential co-viewers 894. For example, the viewing session modifier circuitry 218 converts co-viewer probabilities to MIP cost and assigns one or more co-viewers 896 in a given household to each viewing session 892.

Figure 9:
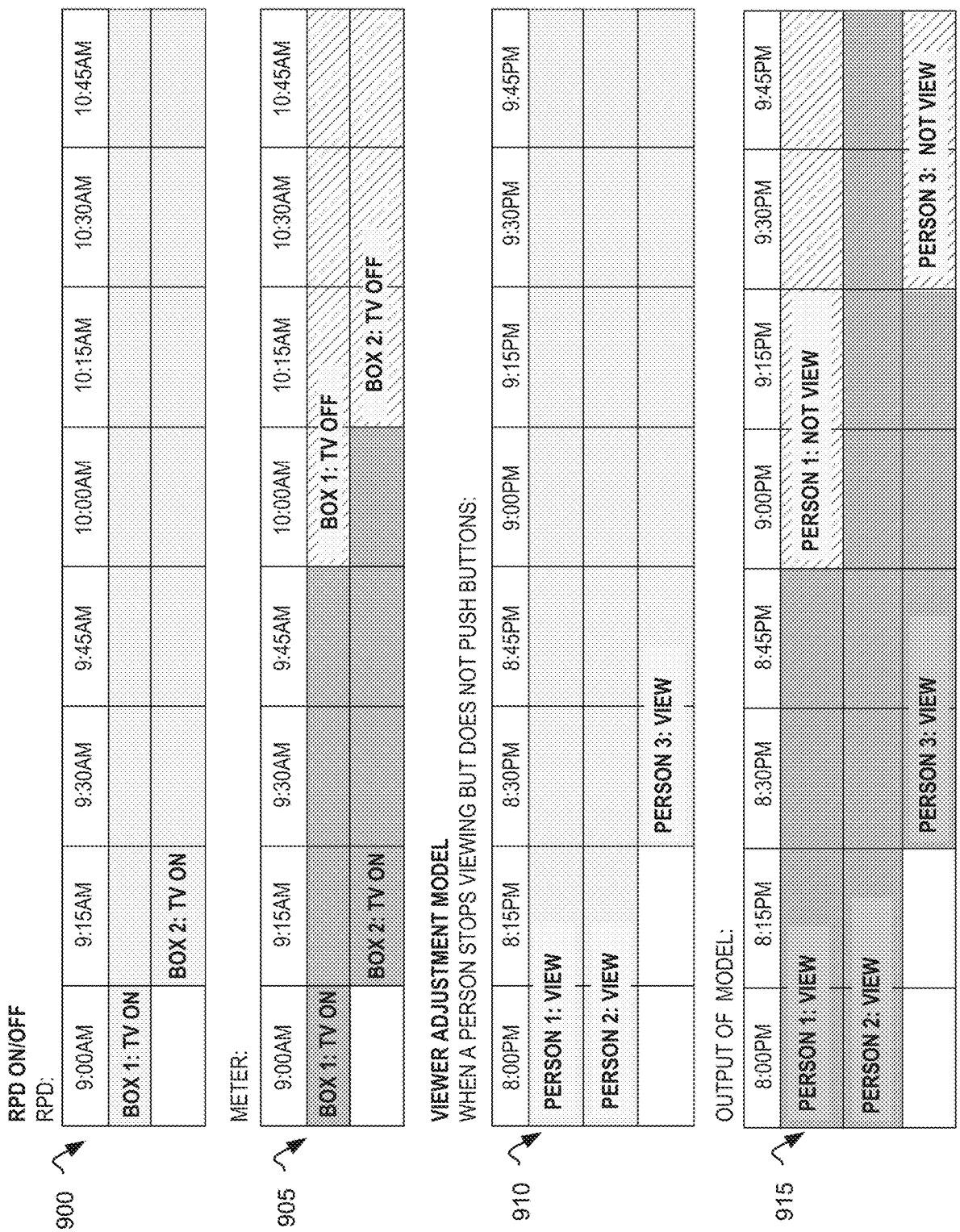
FIG. 9 illustrates an example co-viewing model methodology including TV on session data obtained using return path data (RPD) from a set-top box to account for viewers who stop viewing a TV session but do not properly report the end of their viewing session.

FIG. 9 illustrates example co-viewing model methodology including TV on session data 900, 905 obtained using return path data (RPD) from a set-top box to account for viewers who stop viewing a TV session but do not properly report the end of their viewing session, using an example viewer adjustment model output 910, 915. In the example of FIG. 9, the TV on session data 900, 905 includes TV on/off data (e.g., from the RPD database 113 or the panel meter 108) that indicates whether the media presentation device 104 is on or off (e.g., TV on or TV off) based on set-top box data and/or based on reporting via the panel meter. In examples disclosed herein, the viewer adjustment circuitry 114 of FIG. 1 corrects for occurrences of a household member stopping viewing of a media session but not properly reporting the viewership change using the panel meter, as shown in connection with output 910, including reported views/presence during the media session for three household members. In the example of FIG. 9, the viewer adjustment circuitry 114 outputs adjustments to viewership as shown in the viewer adjustment model output 915, where viewership is adjusted for periods of time when the television is off but the viewer(s) did not report the end of their viewership.

Figure 10A:
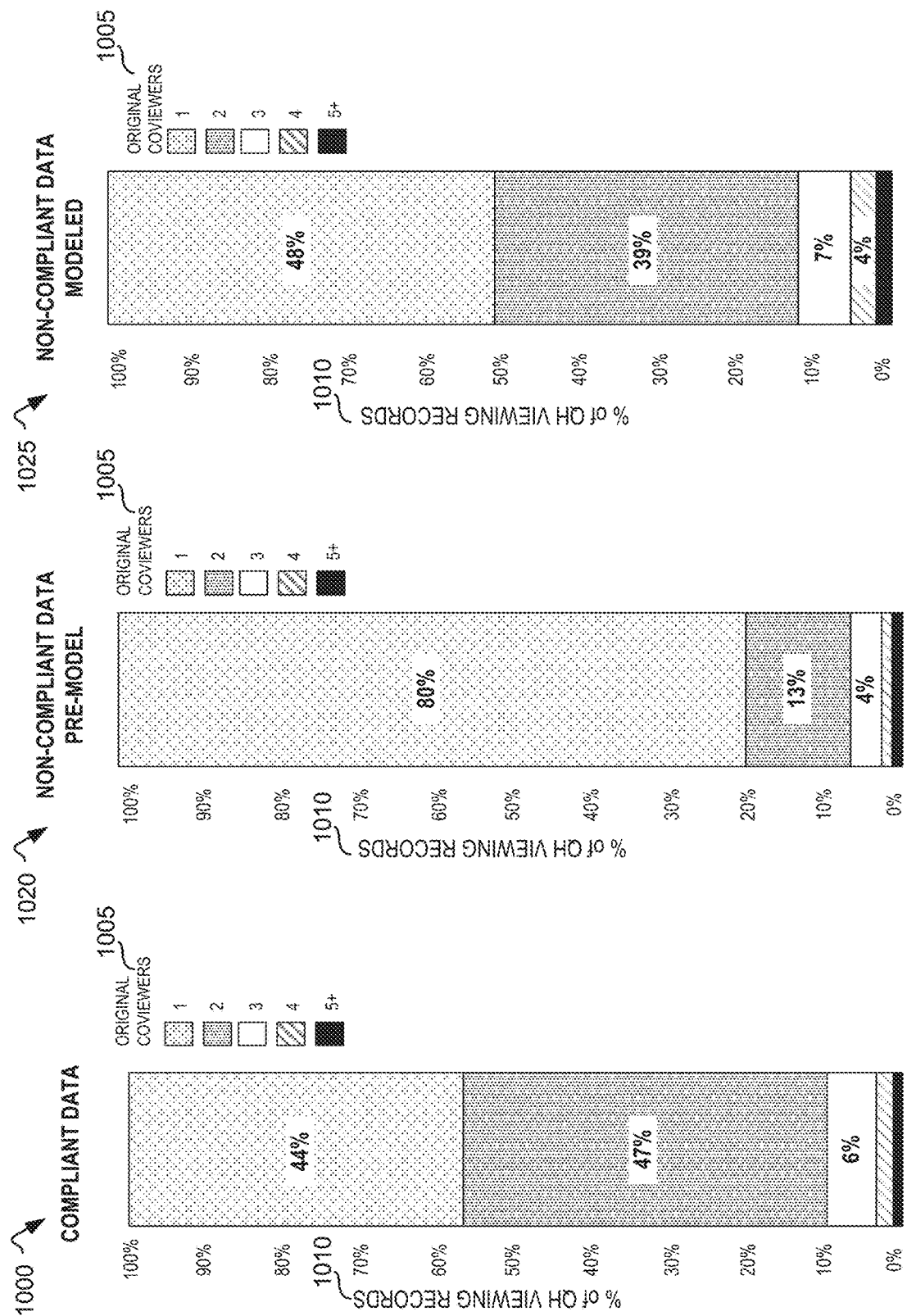
FIG. 10A illustrates example graphical representations of compliant data used to correct the number of co-viewers in non-compliant data.
Figure 10B:
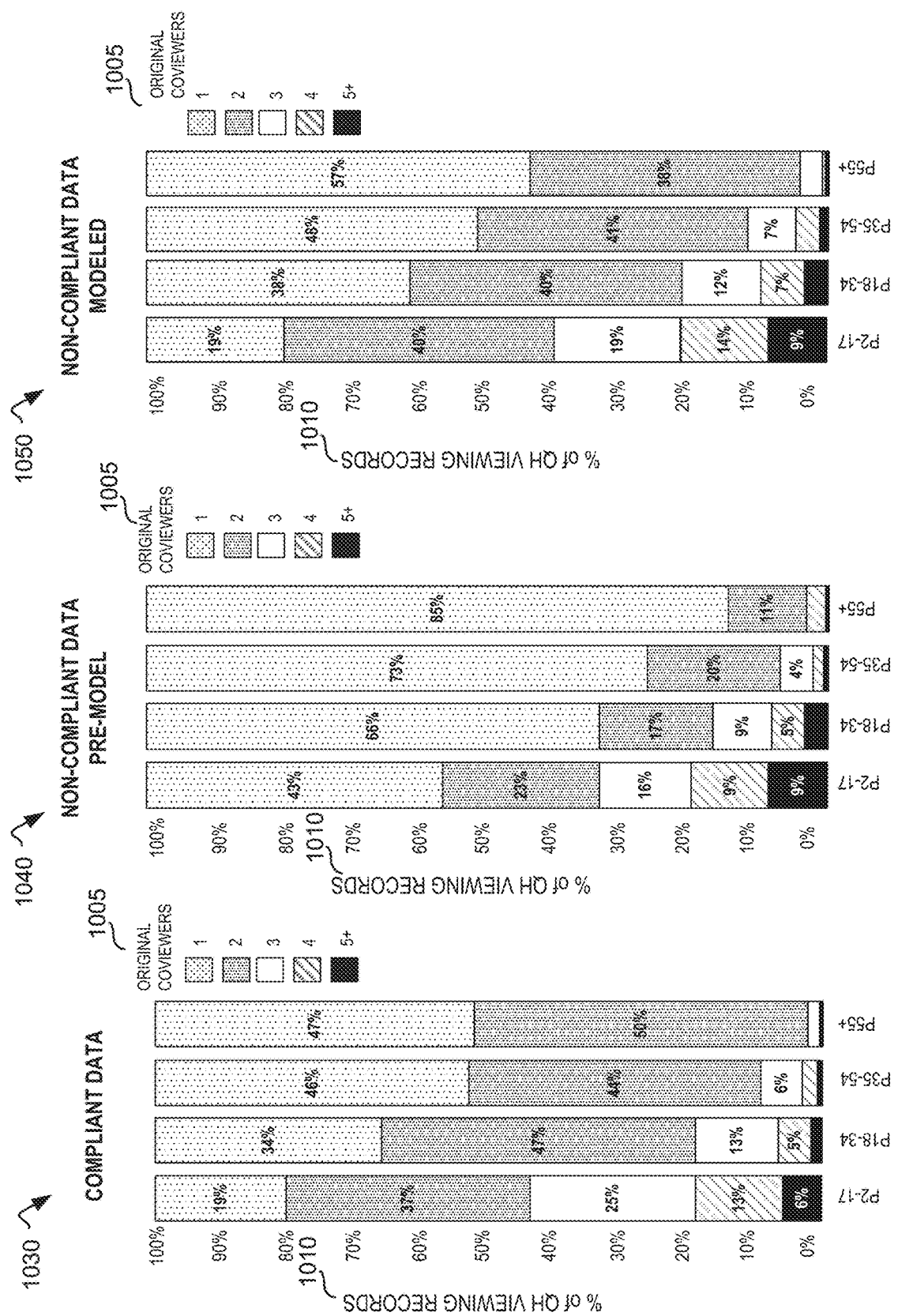
FIG. 10B illustrates example graphical representations of the compliant data and non-compliant data of FIG. 10A, with further detail focusing on viewer demographics.
Figure 10D:
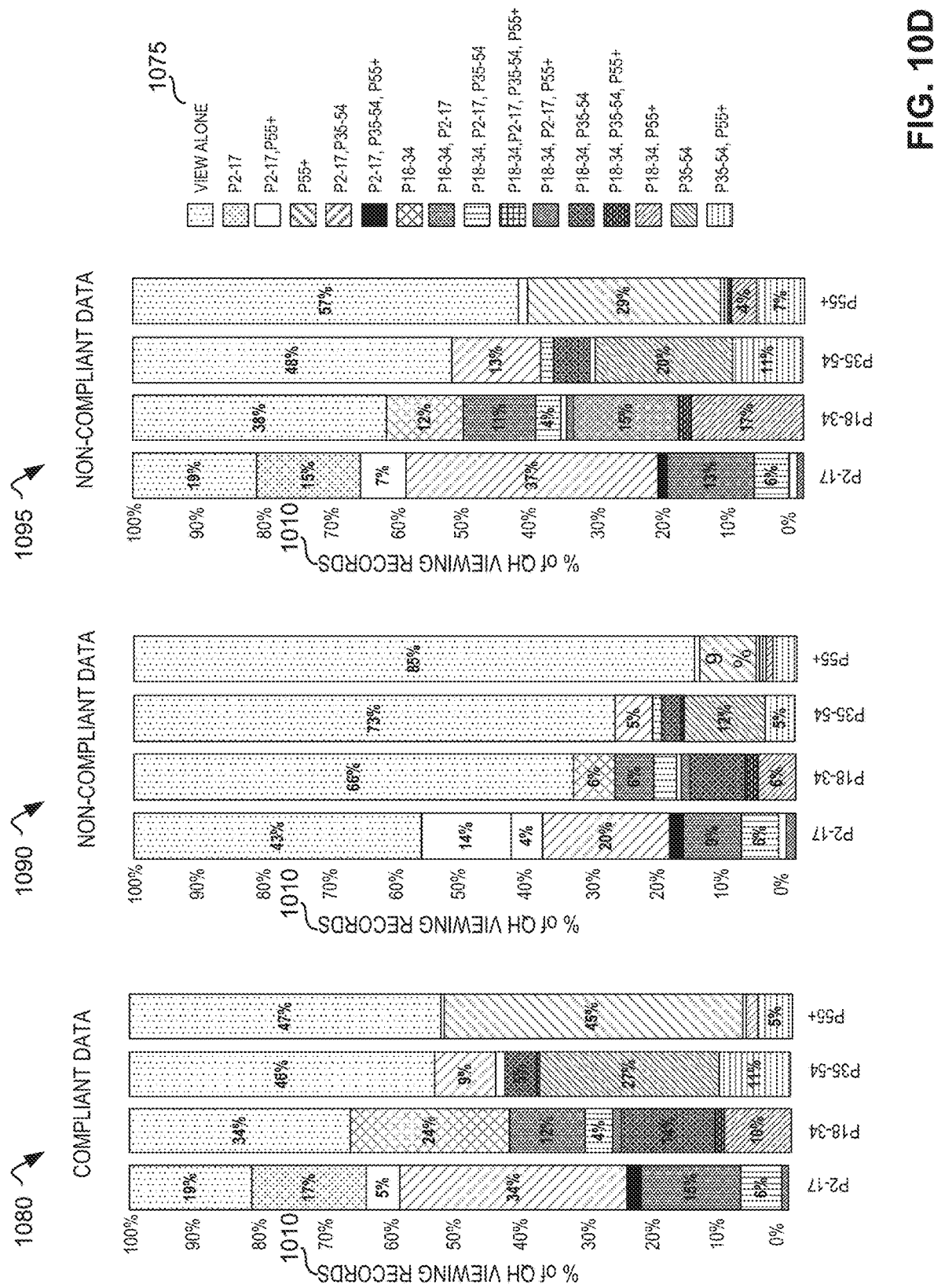
FIG. 10D illustrates example graphical representations of non-compliant pre-model data and corrected post-model data of non-compliant viewers and the demographics of their co-viewers based on age.

FIG. 10A illustrates example graphical representations 1000, 1020, 1025 of compliant data used to correct the number of co-viewers in non-compliant data. In the example of FIG. 10A, compliant data 1000 and non-compliant data 1020 (e.g., identified using the household compliance identifier circuitry 204) is shown including a number of original co-viewers 1005 and a percentage of quarter hour (QH) viewing records 1010. Output from the viewer adjustment circuitry 114 showing adjustments to the non-compliant data 1025 indicates that the viewer adjustments closely reflect the compliant data, indicating the viewer adjustment circuitry 114 can adjust non-compliance to reflect the true distribution of viewership more accurately. FIG. 10B illustrates example graphical representations 1030, 1040, 1050 of the compliant data and non-compliant data of FIG. 10A, with further detail focusing on viewer demographics. In the example of FIG. 10B, the compliant data 1030 and non-compliant data 1040 can be further subdivided based on demographics (e.g., P2-17, P18-34, P35-54, P55+). Output from the viewer adjustment circuitry 114 showing adjustments to the non-compliant data 1050 indicates that the viewer adjustments closely reflect the compliant data, with the distribution of demographics in the adjusted non-compliant data 1050 also representative of the distribution seen in the compliant data. FIG. 10C illustrates example graphical representations 1060, 1070 of compliant data based on a number of co-viewers associated with a given viewer's age group and compliant data based on the age groups of the co-viewers. For example, the compliant data 1070 can include co-viewer demographics 1075 that indicate the age of the co-viewer(s) if co-viewer(s) exist. FIG. 10D illustrates example graphical representations 1080, 1090, 1095 of non-compliant pre-model data and corrected post-model data of non-compliant viewers and the demographics of their co-viewers based on age. In the example of FIG. 10D, the viewer adjustment circuitry 114 adjusts the non-compliant data 1090, resulting in adjusted non-compliant data 1095 demographic co-viewer distributions that are much closer to those seen in the compliant data 1080.

FIG. 11 illustrates example features 1100 associated with compliance or non-compliance and a mapping of the features 1150 to non-compliance conditions. In the example of FIG. 11, the features 1100 include metric(s) 1105 (e.g., audience change rate, audience add rate, etc.), a level at which the metric(s) are calculated 1110 (e.g., household level, TV on session level, etc.), and a description 1115 providing an explanation of the metric. For example, as described in connection with FIG. 4, the household compliance identifier circuitry 204 determines percentiles for household-level metrics to obtain a corresponding threshold used to identify compliant and/or non-compliant households. In the example of FIG. 11, the mapping of the features 1150 to non-compliance conditions indicates whether certain features can be used to determine whether to perform an addition to the total viewership reported (e.g., one viewer percentage, audience add rate, etc.), remove from the total viewership reported (e.g., audience drop rate, etc.), or add and remove from the total viewership reported (e.g., audience change rate, meter prompt rate, etc.).

Figure 12:
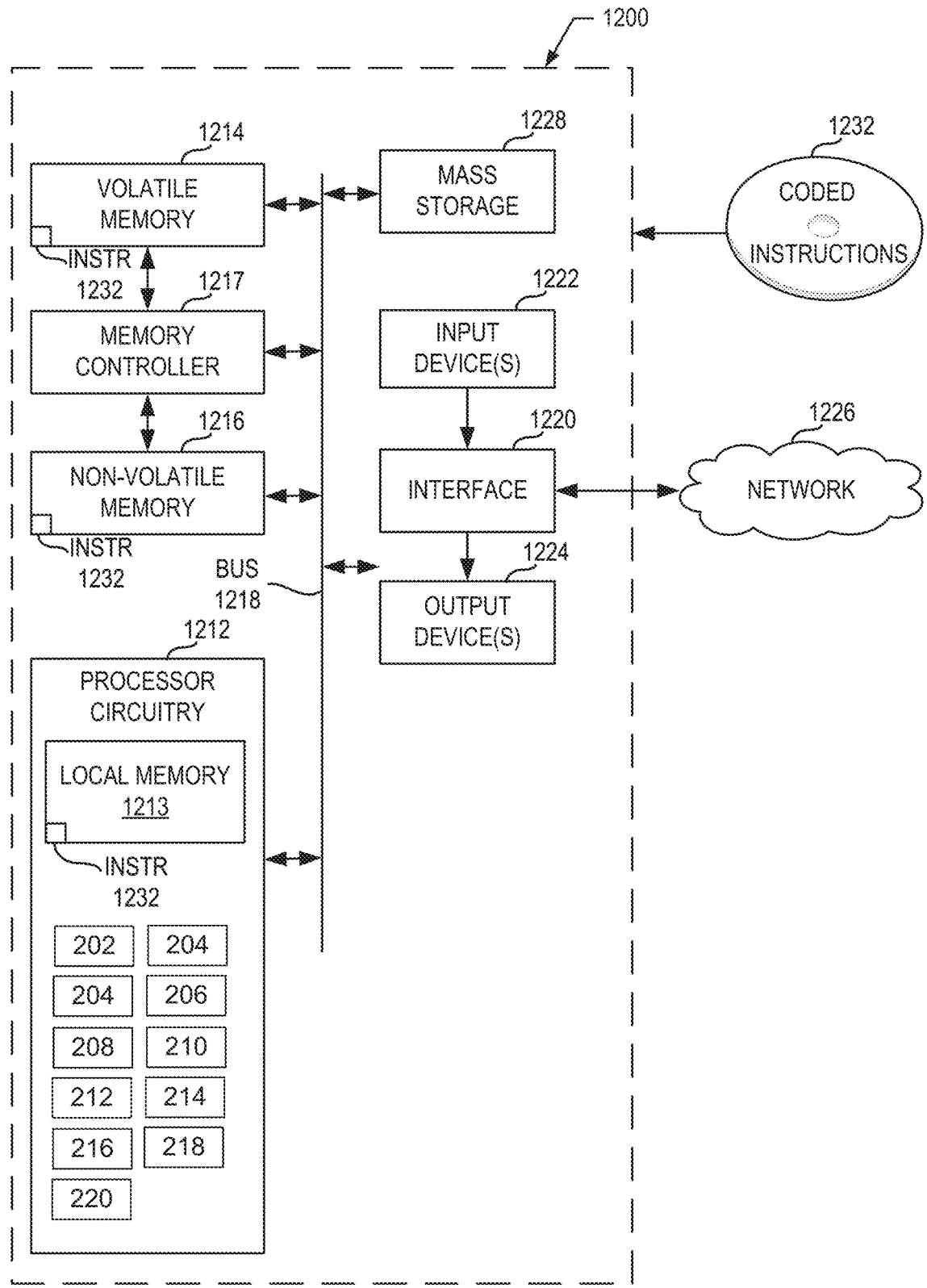
FIG. 12 is a block diagram of an example processing platform including processor circuitry structured to execute the example machine readable instructions and/or the example operations of FIGS. 3-6 to implement the example viewer adjustment circuitry of FIG. 1.

FIG. 12 is a block diagram of an example processor platform 1200 structured to execute and/or instantiate the machine readable instructions and/or operations of FIGS. 3, 4, 5, and/or 6 to implement the viewer adjustment circuitry 114 of FIGS. 1 and 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1200 of the illustrated example includes processor circuitry 1212. The processor circuitry 1212 of the illustrated example is hardware. For example, the processor circuitry 1212 can be implemented by one or more integrated circuits, logic circuits, FPGAs microprocessors, CPUs, GPUs, DSPs, and/or microcontrollers from any desired family or manufacturer. The processor circuitry 1212 may be implemented by one or more semiconductor based (e.g., silicon based) devices. In this example, the processor circuitry 1212 implements the panel data receiver circuitry 202, the household compliance identifier circuitry 204, the TV on session identifier circuitry 206, the compliant and non-compliant data combiner circuitry 208, the cell identifier circuitry 210, the probability calculator circuitry 212, the model trainer circuitry 214, the model generator circuitry 216, the viewing session modifier circuitry 218, and/or the output generator circuitry 220.

The processor circuitry 1212 of the illustrated example includes a local memory 1213 (e.g., a cache, registers, etc.). The processor circuitry 1212 of the illustrated example is in communication with a main memory including a volatile memory 1214 and a non-volatile memory 1216 by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217.

The processor platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user to enter data and/or commands into the processor circuitry 1212. The input device(s) 1222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1224 are also connected to the interface circuitry 1220 of the illustrated example. The output devices 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1200 of the illustrated example also includes one or more mass storage devices 1228 to store software and/or data. Examples of such mass storage devices 1228 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1232, which may be implemented by the machine readable instructions of FIGS. 3-6, may be stored in the mass storage device 1228, in the volatile memory 1214, in the non-volatile memory 1216, and/or on a removable non-transitory computer readable storage medium such as a CD or DVD.

Figure 13:
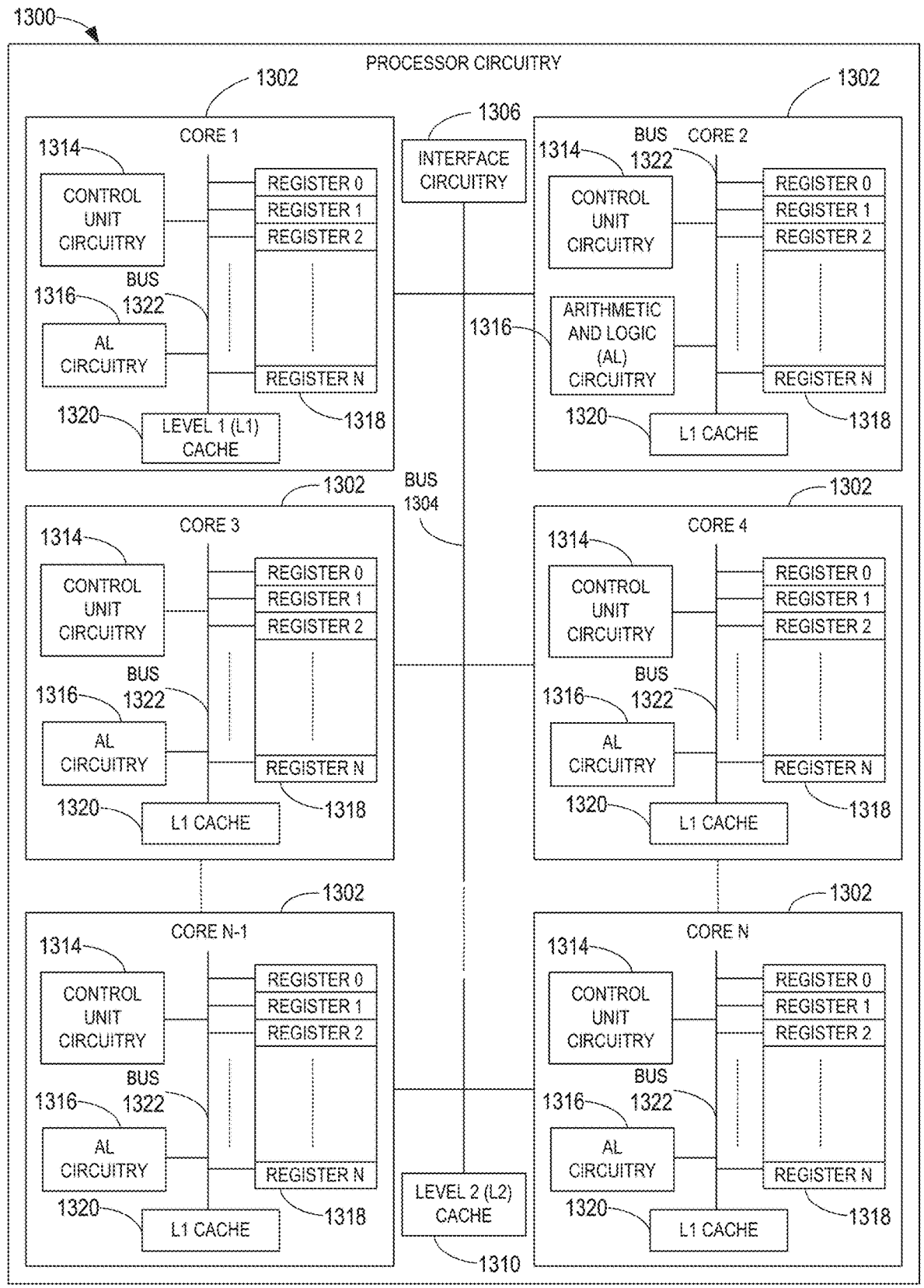
FIG. 13 is a block diagram of an example implementation of the processor circuitry of FIG. 12.

FIG. 13 is a block diagram of an example implementation of the processor circuitry 1212 of FIG. 12. In this example, the processor circuitry 1212 of FIG. 12 is implemented by a microprocessor 1300. For example, the microprocessor 1300 may be a general purpose microprocessor (e.g., general purpose microprocessor circuitry). The microprocessor 1300 executes some or all of the machine readable instructions of the flowcharts of FIGS. 3, 4, 5 and/or 6 to effectively instantiate the circuitry of FIGS. 1 and/or 2 as logic circuits to perform the operations corresponding to those machine readable instructions. In some such examples, the circuitry of FIGS. 1 and/or 2 is instantiated by the hardware circuits of the microprocessor 1300 in combination with the instructions. For example, the microprocessor 1300 may implement multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 3, 4, 5 and/or 6.

The cores 1302 may communicate by an example bus 1304. In some examples, the bus 1304 may implement a communication bus to effectuate communication associated with one(s) of the cores 1302. For example, the bus 1304 may implement at least one of an Inter-Integrated Circuit (I2C) bus, a Serial Peripheral Interface (SPI) bus, a PCI bus, or a PCIe bus. Additionally or alternatively, the bus 1304 may implement any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2_ cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the L1 cache 1320, and an example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer-based operations. In other examples, the AL circuitry 1316 also performs floating point operations. In yet other examples, the AL circuitry 1316 may include first AL circuitry that performs integer-based operations and second AL circuitry that performs floating point operations. In some examples, the AL circuitry 1316 may be referred to as an Arithmetic Logic Unit (ALU). The registers 1318 are semiconductor-based structures to store data and/or instructions such as results of one or more of the operations performed by the AL circuitry 1316 of the corresponding core 1302. For example, the registers 1318 may include vector register(s), SIMD register(s), general purpose register(s), flag register(s), segment register(s), machine specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure including distributed throughout the core 1302 to shorten access time. The second bus 1322 may be implemented by at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 14:
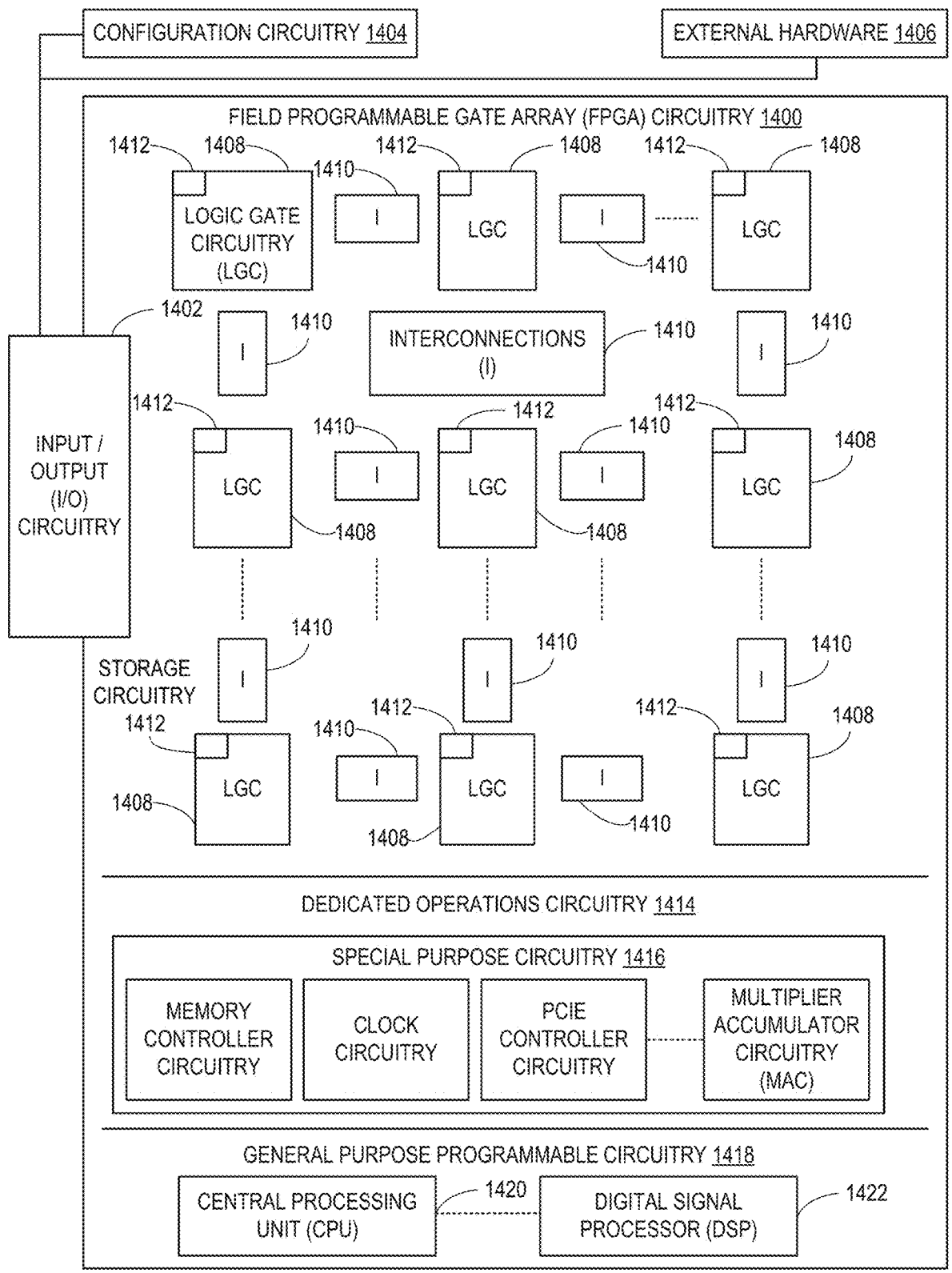
FIG. 14 is a block diagram of another example implementation of the processor circuitry of FIG. 12.

FIG. 14 is a block diagram of another example implementation of the processor circuitry 1212 of FIG. 12. In this example, the processor circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the machine readable instructions in hardware and, thus, can often execute the operations faster than they could be performed by a general purpose microprocessor executing the corresponding software.

More specifically, in contrast to the microprocessor 1300 of FIG. 13 described above (which is a general purpose device that may be programmed to execute some or all of the machine readable instructions represented by the flowcharts of FIGS. 3, 4, 5 and/or 6 but whose interconnections and logic circuitry are fixed once fabricated), the FPGA circuitry 1400 of the example of FIG. 14 includes interconnections and logic circuitry that may be configured and/or interconnected in different ways after fabrication to instantiate, for example, some or all of the machine readable instructions represented by the flowcharts of FIGS. 3, 4, 5 and/or 6. In particular, the FPGA 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the software represented by the flowcharts of FIGS. 3, 4, 5 and/or 6. As such, the FPGA circuitry 1400 may be structured to effectively instantiate some or all of the machine readable instructions of the flowcharts of FIGS. 3, 4, 5 and/or 6 as dedicated logic circuits to perform the operations corresponding to those software instructions in a dedicated manner analogous to an ASIC. Therefore, the FPGA circuitry 1400 may perform the operations corresponding to the some or all of the machine readable instructions of FIGS. 3, 4, 5 and/or 6 faster than the general purpose microprocessor can execute the same.

In the example of FIG. 14, the FPGA circuitry 1400 is structured to be programmed (and/or reprogrammed one or more times) by an end user by a hardware description language (HDL) such as Verilog. The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may implement interface circuitry that may obtain machine readable instructions to configure the FPGA circuitry 1400, or portion(s) thereof. In some such examples, the configuration circuitry 1404 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1406 may be implemented by external hardware circuitry. For example, the external hardware 1406 may be implemented by the microprocessor 1400 of FIG. 14. The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations that may correspond to at least some of the machine readable instructions of FIGS. 3, 4, 5 and/or 6 and/or other desired operations. The logic gate circuitry 1408 shown in FIG. 14 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example Dedicated Operations Circuitry 1414. In this example, the Dedicated Operations Circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the processor circuitry 1212 of FIG. 12, many other approaches are contemplated. For example, as mentioned above, modern FPGA circuitry may include an on-board CPU, such as one or more of the example CPU 1420 of FIG. 14. Therefore, the processor circuitry 1212 of FIG. 12 may additionally be implemented by combining the example microprocessor 1300 of FIG. 13 and the example FPGA circuitry 1400 of FIG. 14. In some such hybrid examples, a first portion of the machine readable instructions represented by the flowcharts of FIGS. 3, 4, 5 and/or 6 may be executed by one or more of the cores 1302 of FIG. 13, a second portion of the machine readable instructions represented by the flowcharts of FIGS. 3, 4, 5 and/or 6 may be executed by the FPGA circuitry 1400 of FIG. 14, and/or a third portion of the machine readable instructions represented by the flowcharts of FIGS. 3, 4, 5 and/or 6 may be executed by an ASIC. It should be understood that some or all of the circuitry of FIG. 12 may, thus, be instantiated at the same or different times. Some or all of the circuitry may be instantiated, for example, in one or more threads executing concurrently and/or in series. Moreover, in some examples, some or all of the circuitry of FIG. 12 may be implemented within one or more virtual machines and/or containers executing on the microprocessor.

In some examples, the processor circuitry 1212 of FIG. 12 may be in one or more packages. For example, the processor circuitry 1300 of FIG. 13 and/or the FPGA circuitry 1400 of FIG. 14 may be in one or more packages. In some examples, an XPU may be implemented by the processor circuitry 1212 of FIG. 12 which may be in one or more packages. For example, the XPU may include a CPU in one package, a DSP in another package, a GPU in yet another package, and an FPGA in still yet another package.

Figure 15:
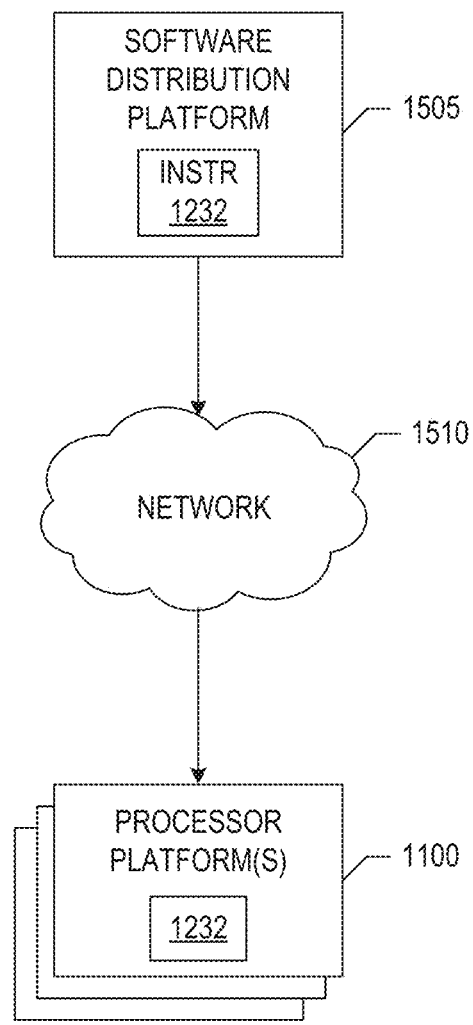
FIG. 15 is a block diagram of an example software distribution platform (e.g., one or more servers) to distribute software (e.g., software corresponding to the example machine readable instructions of FIGS. 3, 4, 5, and/or 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1505 to distribute software such as the example machine readable instructions 1232 of FIG. 12 to hardware devices owned and/or operated by third parties is illustrated in FIG. 15. The example software distribution platform 1505 may be implemented by any computer server, data facility, cloud service, etc., capable of storing and transmitting software to other computing devices. The third parties may be customers of the entity owning and/or operating the software distribution platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232 of FIG. 12, which may correspond to the example machine readable instructions 300, 310, 312 and/or 315 of FIGS. 3, 4, 5 and/or 6, as described above. The one or more servers of the example software distribution platform 1505 are in communication with a network 1510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1232 from the software distribution platform 1505. For example, the software, which may correspond to the example machine readable instructions 300, 310, 312, and/or 315 of FIGS. 3, 4, 5 and/or 6 may be downloaded to the example processor platform 1200 which is to execute the machine readable instructions 1232 to implement the viewer adjustment circuitry 114. In some example, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices.

From the foregoing, it will be appreciated that example systems, methods, apparatus, and articles of manufacture have been disclosed that permit co-viewer adjustments for improved assessment of audience counts associated with a media session. For example, the introduction of portable people meters (PPMs) into local samples (e.g., from local people meters (LPMs)) demonstrates differences in viewing behavior between the two meters, indicating non-compliant button-pushing (e.g., viewership reporting). For example, while some differences are definitional (e.g., PPM measures passively), other differences are due to non-compliance in button-pushing homes. In some examples, "active" viewing collection carries risk, as button-pushing may not capture entire audience or audience changes. For example, in-panel validation (IPV) results can show both instances of viewership undercounting and viewership overcount (e.g., more undercounting than overcounting). For example, approximately 16% of IPV-based calls have some button-pushing non-compliance among family members, with more undercounting than overcounting (2:1). As such, it is desirable to compensate for this risk with audience calibration, including methodology covering aspects of when to assign the audience and how to assign the audience. In some examples, such methodology can be expected to increase ratings, with a greater increase in younger demographics and ethnic homes. At the same time, such methodology should address both undercounting and overcounting, with elimination of undercounts focused on single-view sessions.

In examples disclosed herein, viewership can be modeled in non-compliant scenarios based on viewing data identified as being compliant. In examples disclosed herein, potential non-compliant households (e.g., including panelists who do not accurately log television viewing data) can be identified using past household viewing behavior in homes with a LPM. In examples disclosed herein, non-compliant viewing sessions (e.g., in households with LPMs) can be identified for modification using eligible television sessions (e.g., TV on sessions) based on a comparison of LPM data and PPM data. In examples disclosed herein, compliant data is used to build a viewership model and apply the model to non-compliant data, resulting in an adjustment to non-compliant data that better aligns with data reported by households that are compliant with the reporting and/or logging requirements associated with a given panel meter.

In examples disclosed herein, viewing data can be split into two categories, including "compliant" button-pushing data (e.g., used to build the model) and "non-compliant" button-pushing data (e.g., used to apply the model). In some examples, not all "non-compliant" button-pushing data gets adjusted by the model. In some examples, the data can be split using a two-step process. For example, potential non-compliant households can be identified (e.g., using an LPM versus LPM comparison) based on past household viewing behavior in LPM homes. This data can include audience change (e.g., additional or removal), percentage of sessions with a single viewer, and/or a one viewer dominating viewing. Once potential non-compliant households are identified, eligible TV ON sessions can be determined (e.g., using an LPM versus PPM comparison). For example, PPM data can be used to identify which sessions are eligible to be modified in the non-compliant LPM homes. The PPM data can include number of audience changes, household size, daypart data, and/or session length. In examples disclosed herein, a remediation approach can be used for data including undercounts. For example, homes that are likely compliant (e.g., "good" button-pushers) can be used to modify non-compliance in homes that are likely non-compliant (e.g., "bad" button pushers). As such, "non-compliant" LPM single viewing sessions can be modified to yield LPM modified viewing sessions. For the viewing session selection process, compliant and non-compliant data can be compared and non-compliant data selected in low co-viewing cells (e.g., based on household size, children, dayparts, etc.). In some examples, single viewing sessions with high probability of co-viewing can be selected (e.g., based on ethnicity, race, and/or program genre).

Example methods, apparatus, and systems for co-viewing adjustment are disclosed herein. Further examples and combinations thereof include the following:

Example 1 includes an apparatus for viewership adjustment, the apparatus comprising at least one memory, machine readable instructions, and processor circuitry to execute the machine readable instructions to determine compliant and non-compliant household panel meter data based on household metrics for past household viewing behavior, adjust undercounted viewership data based on an active media session interval associated with the household metrics, adjust overcounted viewership data based on a viewership model, the viewership model trained using the compliant household panel meter data, and output adjusted viewership data based on the adjusted undercounted viewership data and adjusted overcounted viewership data.

Example 2 includes the apparatus of example 1, wherein the processor circuitry is to determine a threshold associated with household compliance, the threshold used to identify the non-compliant household panel meter data.

Example 3 includes the apparatus of example 1, wherein the processor circuitry is to identify active media sessions to be modified in the non-compliant household panel meter data based on personal people meter (PPM) data.

Example 4 includes the apparatus of example 1, wherein the active media session interval is a television session quarter hour.

Example 5 includes the apparatus of example 1, wherein the processor circuitry is to remove an audience member from overcounted viewership data based on return path data, the return path data to provide an on or off status of a media presentation device associated with the active media session.

Example 6 includes the apparatus of example 1, wherein the household metrics include at least one of a household identifier, a media presentation device identifier, total audience-based data, or individual-based data.

Example 7 includes the apparatus of example 1, wherein the processor circuitry is to generate a probability of co-viewership associated with the non-compliant household data, and adjust the undercounted viewership data based on the probability of co-viewership.

Example 8 includes the apparatus of example 7, wherein the processor circuitry is to adjust the undercounted viewership data based on total number of credited quarter hours per viewer.

Example 9 includes a method for viewership adjustment, the method comprising determining compliant and non-compliant household panel meter data based on household metrics for past household viewing behavior, adjusting undercounted viewership data based an active media session interval associated with the household metrics, adjusting overcounted viewership data based on a viewership model, the viewership model trained using the compliant household panel meter data, and outputting adjusted viewership data based on the adjusted undercounted viewership data and overcounted viewership data.

Example 10 includes the method of example 9, further including determining a threshold associated with household compliance, the threshold used to identify the non-compliant household panel meter data.

Example 11 includes the method of example 9, further including identifying active media sessions to be modified in the non-compliant household panel meter data based on personal people meter (PPM) data.

Example 12 includes the method of example 9, wherein the active media session interval is a television session quarter hour.

Example 13 includes the method of example 9, further including removing an audience member from overcounted viewership data based on return path data, the return path data to provide an on or off status of a media presentation device associated with the active media session.

Example 14 includes the method of example 9, wherein the household metrics include at least one of a household identifier, a media presentation device identifier, total audience-based data, or individual-based data.

Example 15 includes the method of example 9, further including adjusting undercounted viewership data by generating a probability of co-viewership associated with the non-compliant household data.

Example 16 includes a non-transitory computer readable storage medium comprising instructions that, when executed, cause a processor to at least determine compliant and non-compliant household panel meter data based on household metrics for past household viewing behavior, adjust undercounted viewership data based on an active media session interval associated with the household metrics, adjust overcounted viewership data based on a viewership model, the viewership model trained using the compliant household panel meter data, and output adjusted viewership data based on the adjusted undercounted viewership data and adjusted overcounted viewership data.

Example 17 includes the non-transitory computer readable storage medium of example 16, wherein the instructions, when executed, cause the processor to determine a threshold associated with household compliance, the threshold used to identify non-compliant household panel meter data.

Example 18 includes the non-transitory computer readable storage medium of example 16, wherein the instructions, when executed, cause the processor to identify active media sessions to be modified in the non-compliant household panel meter data based on personal people meter (PPM) data.

Example 19 includes the non-transitory computer readable storage medium of example 16, wherein the active media session interval is a television session quarter hour.

Example 20 includes the non-transitory computer readable storage medium of example 16, wherein the instructions, when executed, cause the processor to remove an audience member from overcounted viewership data based on return path data, the return path data to provide an on or off status of a media presentation device associated with the active media session.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A computing system for viewership adjustment, the computing system comprising:
    a processor and
    a non-transitory computer-readable storage medium, having stored thereon program instructions that, upon execution by the processor, cause performance of a set of operations comprising:
        determining compliant and non-compliant household panel meter data based on household metrics for past household viewing behavior;
        adjusting undercounted viewership data based on an active media session interval associated with the household metrics;
        adjusting overcounted viewership data based on a viewership model, the viewership model trained using the compliant household panel meter data; and
        outputting adjusted viewership data based on the adjusted undercounted viewership data and adjusted overcounted viewership data.

2. The apparatus computing system of claim 1, wherein the processor set of operations further comprise determining a threshold associated with household compliance, the threshold used to identify the non-compliant household panel meter data.

3. The computing system of claim 1, wherein the set of operations further comprise identifying active media sessions to be modified in the non-compliant household panel meter data based on personal people meter (PPM) data.

4. The computing system of claim 1, wherein the active media session interval is a television session quarter hour.

5. The computing system of claim 1, wherein the set of operations further comprise removing an audience member from overcounted viewership data based on return path data, the return path data to provide an on or off status of a media presentation device associated with the active media session.

6. The computing system of claim 1, wherein the household metrics include at least one of a household identifier, a media presentation device identifier, total audience-based data, or individual-based data.

7. The computing system of claim 1, wherein the set of operations further comprise:
    generating a probability of co-viewership associated with the non-compliant household data; and
    adjusting the undercounted viewership data based on the probability of co-viewership.

8. The computing system of claim 7, wherein the set of operations further comprise adjusting the undercounted viewership data based on total number of credited quarter hours per viewer.

9. A method for viewership adjustment, the method comprising:
determining compliant and non-compliant household panel meter data based on household metrics for past household viewing behavior;
adjusting undercounted viewership data based an active media session interval associated with the household metrics;
adjusting overcounted viewership data based on a viewership model, the viewership model trained using the compliant household panel meter data; and
outputting adjusted viewership data based on the adjusted undercounted viewership data and overcounted viewership data.

10. The method of claim 9, further including determining a threshold associated with household compliance, the threshold used to identify the non-compliant household panel meter data.

11. The method of claim 9, further including identifying active media sessions to be modified in the non-compliant household panel meter data based on personal people meter (PPM) data.

12. The method of claim 9, wherein the active media session interval is a television session quarter hour.

13. The method of claim 9, further including removing an audience member from overcounted viewership data based on return path data, the return path data to provide an on or off status of a media presentation device associated with the active media session.

14. The method of claim 9, wherein the household metrics include at least one of a household identifier, a media presentation device identifier, total audience-based data, or individual-based data.

15. The method of claim 9, further including adjusting undercounted viewership data by generating a probability of co-viewership associated with the non-compliant household data.

16. A non-transitory computer readable storage medium comprising instructions that, when executed, cause a processor to at least:
determine compliant and non-compliant household panel meter data based on household metrics for past household viewing behavior;
adjust undercounted viewership data based on an active media session interval associated with the household metrics;
adjust overcounted viewership data based on a viewership model, the viewership model trained using the compliant household panel meter data; and
output adjusted viewership data based on the adjusted undercounted viewership data and adjusted overcounted viewership data.

17. The non-transitory computer readable storage medium of claim 16, wherein the instructions, when executed, cause the processor to determine a threshold associated with household compliance, the threshold used to identify non-compliant household panel meter data.

18. The non-transitory computer readable storage medium of claim 16, wherein the instructions, when executed, cause the processor to identify active media sessions to be modified in the non-compliant household panel meter data based on personal people meter (PPM) data.

19. The non-transitory computer readable storage medium of claim 16, wherein the active media session interval is a television session quarter hour.

20. The non-transitory computer readable storage medium of claim 16, wherein the instructions, when executed, cause the processor to remove an audience member from overcounted viewership data based on return path data, the return path data to provide an on or off status of a media presentation device associated with the active media session.

* * * * *